United States Patent
Nam et al.

(10) Patent No.: US 9,490,734 B2
(45) Date of Patent: Nov. 8, 2016

(54) MOTOR CONTROL DEVICE AND METHOD OF CONTROLLING THE SAME

(75) Inventors: Jaewon Nam, Daejeon (KR); Young Kyun Cho, Daejeon (KR); Hui Dong Lee, Daejeon (KR); Yil Suk Yang, Daejeon (KR); Jong-Kee Kwon, Daejeon (KR); Jongdae Kim, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 1165 days.

(21) Appl. No.: 13/443,823

(22) Filed: Apr. 10, 2012

(65) Prior Publication Data
US 2012/0268052 A1    Oct. 25, 2012

(30) Foreign Application Priority Data
Apr. 19, 2011  (KR) .................. 10-2011-0036187

(51) Int. Cl.
H02P 6/18 (2016.01)
H02P 6/10 (2006.01)
H02P 6/20 (2016.01)
H02P 6/08 (2016.01)

(52) U.S. Cl.
CPC .............. H02P 6/182 (2013.01); H02P 6/10 (2013.01); *H02P 6/085* (2013.01); *H02P 6/18* (2013.01); *H02P 6/205* (2013.01); *H02P 2209/07* (2013.01)

(58) Field of Classification Search
CPC .... H02P 6/182; H02P 6/085; H02P 2209/07; H02P 6/18; H02P 6/205
USPC .................................................... 318/400.34
See application file for complete search history.

(56) References Cited

U.S. PATENT DOCUMENTS

| 5,625,264 A * | 4/1997 | Yoon ............... H02P 6/002 318/400.02 |
| 2002/0041168 A1* | 4/2002 | Mann ............... H02P 25/088 318/400.23 |
| 2011/0175556 A1* | 7/2011 | Tobari ............. H02P 21/05 318/400.02 |

FOREIGN PATENT DOCUMENTS

| KR | 10-0130537 B1 | 11/1997 |
| KR | 10-1999-0071005 A | 9/1999 |
| KR | 10-2009-0007051 A | 1/2009 |

* cited by examiner

Primary Examiner — Shawki S Ismail
Assistant Examiner — Bradley Brown

(57) ABSTRACT

A motor control device including a preprocessing portion calculating a counter electromotive force using an analog operation is provided. The motor control device may include an offset compensation portion and a counter electromotive force measuring portion. The offset compensation portion receives a three-phase current signal from the motor and compensates an offset of the three-phase current signal. The counter electromotive force measuring portion receives the compensated current signal and a three-phase voltage signal from the motor and calculates the received current signal and the received voltage signal using an analog operation to provide the calculated result.

19 Claims, 18 Drawing Sheets (iii) $t=t_2$

Torque waveform of before applying the present inventive concept to motor

Torque waveform of after applying the present inventive concept to motor

MOTOR CONTROL DEVICE AND METHOD OF CONTROLLING THE SAME

CROSS-REFERENCE TO RELATED APPLICATIONS

This U.S. non-provisional patent application claims priority under 35 U.S.C. §119 of Korean Patent Application No. 10-2011-0036187, filed on Apr. 19, 2011, the entire contents of which are hereby incorporated by reference.

BACKGROUND

The present inventive concept herein relates to motors, and more particularly, to a motor control apparatus and a method of controlling the same.

A motor is divided into a direct current motor and an alternating current motor. Since it is difficult to control an alternating current motor as compared with a direct current motor, the alternating current motor has not been well used in a precision industry. However, as a control technology has been advanced these days, a use of alternating current motor is being increased. A brushless motor that is a kind of alternating current motor has a long operation life as compared with other motor and may generate a big torque and thereby it may be used in various industry fields.

When driving a motor, minute vibration or noise may be generated. Generally, vibration or noise may be caused by cogging torque and torque ripple. The cogging torque is generated by a mechanical cause such as an interaction between a permanent magnet and a slot. The torque ripple is generated by an electrical cause such as electrical noises and incompleteness of electrical control. One of elements that make an electrical control difficult is that torque actually occurred does not accurately follow a torque command applied from the outside. Thus, to reduce torque ripple, a control method that matches up the torque command with a waveform of actual torque is needed.

SUMMARY

Embodiments of the inventive concept provide a motor control device. The motor control device may include a preprocessing portion calculating a counter electromotive force corresponding to a current signal of each phase or a voltage signal of each phase from a three-phase current signal of motor or a three-phase voltage signal of motor using an analog operation and a control portion driving the motor with reference to the counter electromotive force.

Embodiments of the inventive concept also provide a method of measuring a counter electromotive force harmonic coefficient. The method may include receiving sine wave signals the amplitude of angular frequency of which is odd number times of rotation angular frequency and a counter electromotive force; performing an operation of dividing the counter electromotive force by angular frequency; obtaining cross correlation functions between the received sine wave signals and the counter electromotive force on which a dividing operation is performed; and obtaining the maximum values of the cross correlation functions to provide them as harmonic coefficients of the counter electromotive force.

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Figure 1:
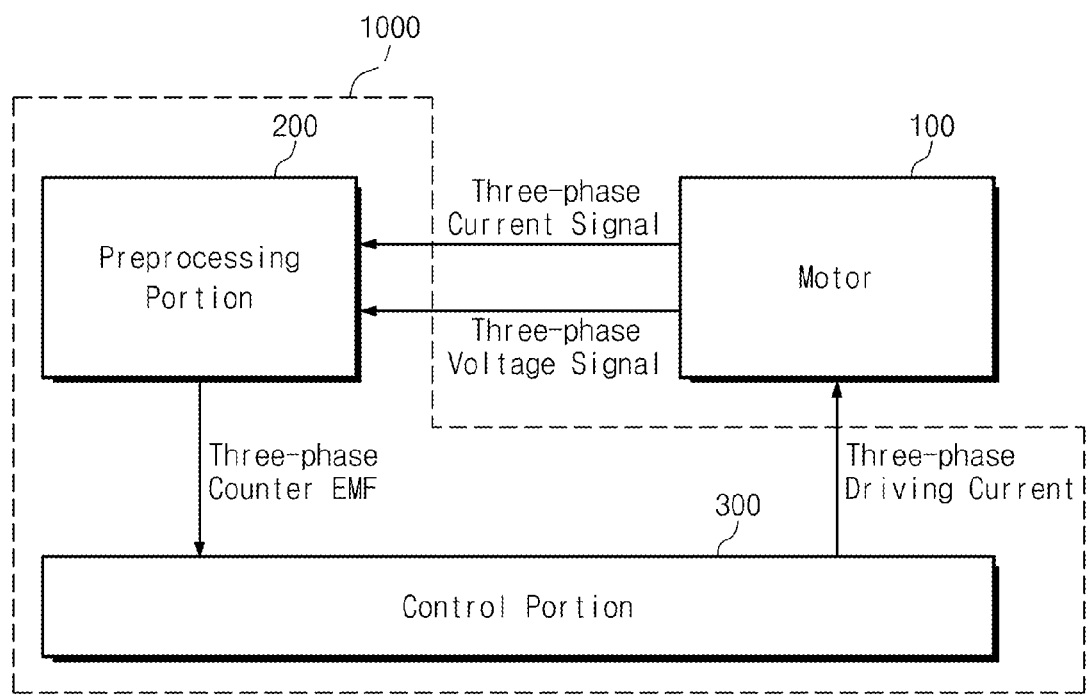
FIG. 1 is a block diagram illustrating a motor control apparatus in accordance with some embodiments of the inventive concept.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

Inducement of Compensation Current Minimizing Torque Ripple

Hereinafter, description of principle minimizing torque ripple of motor is provided. The torque ripple of motor is generated because an actual torque of motor does not accurately follow the applied torque command. The reason is that the actual torque includes a function of location θ of motor. That is, the actual torque is dependent on a location of motor. Thus, if an effect of location is not excluded, the actual torque does not accurately follow a torque command.

A control method of producing an independent actual torque to a location θ of motor. In the control method, the actual torque is in proportion to a torque command and thereby waveforms may coincide with each other. That is, since the actual torque well follows the torque command, a torque ripple is reduced.

To induce an operation equation of general brushless direct current motor, the following assumptions are made.

1) Motor operates in a linear region and hysteresis loss is neglected. 2) A gap between a rotor and a stator is uniform. 3) Mutual inductance of each interphase is uniform regardless of a location of a rotor.

A phase voltage of motor is represented by mathematical formula 1.

$$V_k = R_k \times I_k + \frac{d\lambda_k}{dt}, (k = 1, 2, 3)$$ [mathematical formula 1]

Herein, $V_k$ is a phase voltage, $I_k$ is a phase current and $R_k$ is a phase resistor, $\lambda_k$ is a phase magnetic flux linkage and k means each phase of three-phase motor. The phase magnetic flux linkage $\lambda_k$ in the motor includes a magnetic flux linkage by self-inductance, a magnetic flux linkage by mutual inductance and a magnetic flux linkage by a rotor. Thus, the phase magnetic flux $\lambda_k$ may be represented by a mathematical formula 2.

$$\lambda_k = \sum_{j=1}^{3} L_{jk} I_j + \lambda_{mk}, (k = 1, 2, 3)$$

Herein, $L_{jk}$ is mutual inductance between phase j and phase k (j≠k), $L_{kk}$ is self-inductance of phase k and $\lambda_{mk}$ is magnetic flux linkage of phase k by rotor. If substituting the mathematical formula 2 for the mathematical formula 1, a mathematical formula 3 is drawn.

$$V_k = R_k \times I_k + \sum_{j=1}^{3} L_{jk} \frac{dI_j}{dt} + \frac{d\lambda_{mk}}{d\theta} \times \frac{d\theta}{dt}, (k = 1, 2, 3)$$

Herein, θ is a location of rotor. In the mathematical formula 3, the third section of the right side corresponds to counter electromotive force of motor. Since the counter electromotive force is proportional to a speed (w=dθ/dt) of rotor, as the motor operates in high speed, the counter electromotive force becomes great. A value obtained by differentiating the magnetic flux linkage $\lambda_{mk}$ of phase k by rotor with respect to the location θ of rotor is defined as an eigenfunction of the motor. The eigenfunction of the motor is dependent on the location θ of rotor. In three-phase motor, each phase has a location difference of 2/3π. Thus, the eigenfunction (hereinafter it is called g (θ)) of the motor is defined as a mathematical formula 4.

$$\frac{d\lambda_{m1}}{d\theta} = g(\theta)$$

$$\frac{d\lambda_{m2}}{d\theta} = g(\theta - 2/3\pi)$$

$$\frac{d\lambda_{m3}}{d\theta} = g(\theta + 2/3\pi)$$

Generally, torque generated by one phase is represented by multiplying a phase current $I_k$ by the eigenfunction of the motor g (θ). Since the whole generated torque is sum of torques by each phase, the whole torque is represented by a mathematical formula 5.

$$T = T_1 + T_2 + T_3$$
$$= g(\theta) \times I_1 + g(\theta - 2/3\pi) \times I_2 + g(\theta + 2/3\pi) \times I_3$$

g (θ) is the eigenfunction of the motor and may have a trapezoidal shape, a sine wave shape or a sine-like-wave shape. In the mathematical formula 5, the whole torque is a function of the location θ. Thus, the whole torque T may have a torque ripple depending on the location θ of the motor. To produce a torque without torque ripple, the whole torque should not be dependent on the location θ of the motor.

According to the mathematical formula 5, the dependence of the whole torque on the location θ occurred by the function g (θ). Thus, if the phase current $I_K$ offsets changes of g (θ) in accordance with the location θ, the whole torque is independent on the location θ. That is, since the whole torque is also a function of the phase current, an effect in accordance with the location θ may be removed by controlling the phase current. At this time, the phase current should be a function of the location θ.

An ideal current signal not generating torque ripple is defined as a compensation current. The compensation current may be defined by a mathematical formula 6.

$$I_K = I_M \times f_k(\theta)$$ [mathematical formula 6]

Herein, $I_k$ is a compensation current, IM is a torque command being output from a speed controller and $f_k(\theta)$ is a current command not generating location dependent torque ripple. If substituting the mathematical formula 6 for the mathematical formula 5, a torque like a mathematical formula 7 is obtained.

$T=I_M \times [g(\theta) \times f_1(\theta)+g(\theta-2/3\pi) \times f_2(\theta)+g(\theta+2/3\pi) \times f_3(\theta)]$ [mathematical formula 7]

If [g(θ)f1(θ)+g(θ−2/3π)f2(θ)+g(θ+2/3π)f3(θ)]=constant, since the torque T is proportional to $I_M$, a torque ripple according to the location θ does not exist. Since each phase of motor has a location difference of 2/3, f2(θ)=f1(θ−2/3π), f3(θ)=f1(θ+2/3π) are completed. To obtain a wanted current command, the following is assumed.

1) A connection type of stator of motor is symmetrical.
2) A magnetic flux distribution of rotor is symmetrical with respect to the rotor.

Since g(θ) is a function of location of the rotor, the g(θ) becomes a periodic function having a period of 2π. Since $g(\theta)$ is a periodic function, Fourier series may be expanded. According to an assumption, since an even number harmonic section does not exist and is an odd function, a cosine section also does not exist. Fourier series of $g(\theta)$ may be represented by a mathematical formula 8.

$$g(\theta)=E_1 \sin \theta + E_3 \sin 3\theta + E_5 \sin 5\theta + \ldots \quad \text{[mathematical formula 8]}$$

Coefficient $E_1$, $E_3$, $E_5$, ... are defined as a harmonic coefficient of counter electromotive force. Since a current command $f_k(\theta)$ is also a periodic function, if using Fourier series expansion, the mathematical formula 6 is the same with a mathematical formula 9. Since the sum of three-phase current is 0, $\sin(3n\theta)$ does not exist (n=1, 2, 3, ... ).

[mathematical formula 9]

$$I_1 = I_M \times f_1(\theta)$$
$$= I_M \times (D_1 \sin\theta + D_5 \sin 5\theta + D_7 \sin 7\theta + D_{11} \sin 11\theta + \ldots)$$

Since a torque T1 of one phase is $I_1 \times g(\theta)$, the torque of one phase is the same with the result obtained by multiplying the mathematical formula 8 by the mathematical formula 9 (a mathematical formula 10).

$$T_1 = I_M \times (D_1 \sin \theta + D_5 \sin 5\theta + D_7 \sin 7\theta + D_{11} \sin 11\theta + \ldots) \times (E_1 \sin \theta + E_3 \sin 3\theta + E_5 \sin 5\theta + \ldots)$$

$$T_1 = I_M \times (P_0 + P_2 \cos 2\theta + P_4 \cos 4\theta + P_6 \cos 6\theta + \ldots) \quad \text{[mathematical formula 10]}$$

Since there is a phase difference of $2/3\pi$ between phases of the three-phase motor, T2, T3 may be represented by a mathematical formula 11.

$$T_2 = I_M \times (P_0 + P_2 \cos(2\theta + 2/3\pi) + P_4 \cos(4\theta - 2/3\pi) + P_6 \cos 6\theta + \ldots)$$

$$T_3 = I_M \times (P_0 + P_2 \cos(2\theta - 2/3\pi) + P_4 \cos(4\theta + 2/3\pi) + P_6 \cos 6\theta + \ldots) \quad \text{[mathematical formula 11]}$$

Since $\cos t + \cos(t-2/3\pi) + \cos(t+2/3\pi)=0$, the whole torque T may be represented by a mathematical formula 12.

[mathematical formula 12]

$$T = T_1 + T_2 + T_3$$
$$= I_M \times (3P_0 + 3P_6 \cos 6\theta + 3P_{12} \cos 12\theta + \ldots)$$
$$= K_0 + K_6 \cos 6\theta + K_{12} \cos 12\theta + K_{18} \cos 18\theta + K_{24} \cos 24\theta + \ldots$$

Herein, a coefficient of each of harmonic section is as follows.

$$K_0 = 3I_M \times P_0 = 1.5 I_M \times [E_1 D_1 + E_5 D_5 + E_7 D_7 + E_{11} D_{11} + \ldots]$$

$$K_6 = 3I_M \times P_6 = 1.5 I_M \times [D_1(E_7-E_5)+D_5(E_{11}-E_1)+D_7(E_1-E_{13})+D_{11}(E_5-E_7)+\ldots]$$

$$K_{12} = 3I_M \times P_{12} = 1.5 I_M \times [D_1(E_{13}-E_{11})+D_5(E_{17}-E_7)+D_7(E_{19}-E_5)+D_{11}(E_{23}-E_1)+\ldots]$$

$$K_{18} = 3I_M \times P_{18} = 1.5 I_M \times [D_1(E_{19}-E_{17})+D_5(E_{23}-E_{13})+D_7(E_{25}-E_{11})+D_{11}(E_{29}-E_7)+\ldots]$$

$$K_{24} = 3I_M \times P_{24} = 1.5 I_M \times [D_1(E_{25}-E_{23})+D_5(E_{29}-E_{19})+D_7(E_{31}-E_{17})+D_{11}(E_{35}-E_{13})+\ldots]$$

To simplify the formula, sections greater than $I_{11}$ are neglected because their sizes are small. Sections greater than $E_{15}$ are neglected by the same reason. Also, since sections having a high frequency greater than $K_{16}$ are low-passed by inertia of motor, they may be neglected. At this time, a condition that makes harmonic sections $K_6$ and $k_{12}$ remaining in the torque T become zero is obtained (mathematical formula 13).

$$D_1(E_5-E_7)=D_5(E_{11}-E_1)+D_7(E_1-E_{13})$$

$$D_1(E_{13}-E_{11})=D_5 E_7 + D_7 E_5 \quad \text{[mathematical formula 13]}$$

$D_5$ and $D_7$ satisfying the mathematical formula 13 are represented by a mathematical formula 14.

[mathematical formula 14]

$$D_5 = \frac{D_1[E_5(E_5-E_7)-(E_1+E_{13})(E_{13}-E_{11})]}{[E_5(E_{11}-E_1)-E_7(E_1+E_{13})]}$$

$$D_7 = \frac{D_1[E_7(E_5-E_7)-(E_{11}+E_1)(E_{13}-E_{11})]}{[E_7(E_1+E_{13})-E_5(E_{11}-E_1)]}$$

Compensation coefficients $G_5$ and $G_7$ are defined like a mathematical formula 15.

[mathematical formula 15]

$$G_5 = \frac{D_5}{D_1} = \frac{[E_5(E_5-E_7)-(E_1+E_{13})(E_{13}-E_{11})]}{[E_5(E_{11}-E_1)-E_7(E_1+E_{13})]}$$

$$G_7 = \frac{D_7}{D_1} = \frac{[E_7(E_5-E_7)-(E_{11}+E_1)(E_{13}-E_{11})]}{[E_7(E_1+E_{13})-E_5(E_{11}-E_1)]}$$

If rewriting the phase current $I_1$ using the compensation coefficients $G_5$ and $G_7$, the phase current $I_1$ may be represented by a mathematical formula 16.

$$I_1 = I_M \times D_1 (\sin\theta + G_5 \sin 5\theta + G_7 \sin 7\theta) \quad \text{[mathematical formula 16]}$$

Herein, $D_1$ is a coefficient of first section of formula expanding $f_1(\theta)$ by Fourier series. If substituting mathematical formulas 15 and 16 into the mathematical formula 12, a final torque is represented by a mathematical formula 17.

$$T = 1.5 I_M \times D_1 (E_1 + G_5 E_5 + G_7 E_7) \quad \text{[mathematical formula 17]}$$

In the mathematical formula 17, a section of location ($\theta$) is disappeared and the whole torque is proportional to $I_M$. That is, applying a compensation current $I_k$ like the mathematical formula 16, a torque ripple which is dependent on the location ($\theta$) may be disappeared. Hereinafter, specific constitution and operation of the inventive concept will be described.

1. Embodiments of Motor Control Device

FIG. 1 is a block diagram illustrating a motor control apparatus in accordance with some embodiments of the inventive concept. Referring to FIG. 1, the motor control device 1000 includes a preprocessing portion 200 and a control portion 300. The preprocessing portion 200 receives a three-phase current signal and a three-phase voltage signal applied to a motor 100 and calculates a counter electromotive force with reference to the received three-phase current signal and the received three-phase voltage signal. The calculation of the counter electromotive force in the preprocessing portion 200 is performed by an analog arithmetic operation. The calculated counter electromotive force is provided to the control portion 300. The control portion 300 outputs a driving current to the motor 100. At this time, the control portion 300 provides a three-phase driving current not generating a torque ripple with reference to the counter electromotive force provided from the preprocessing portion 200.

Figure 2:
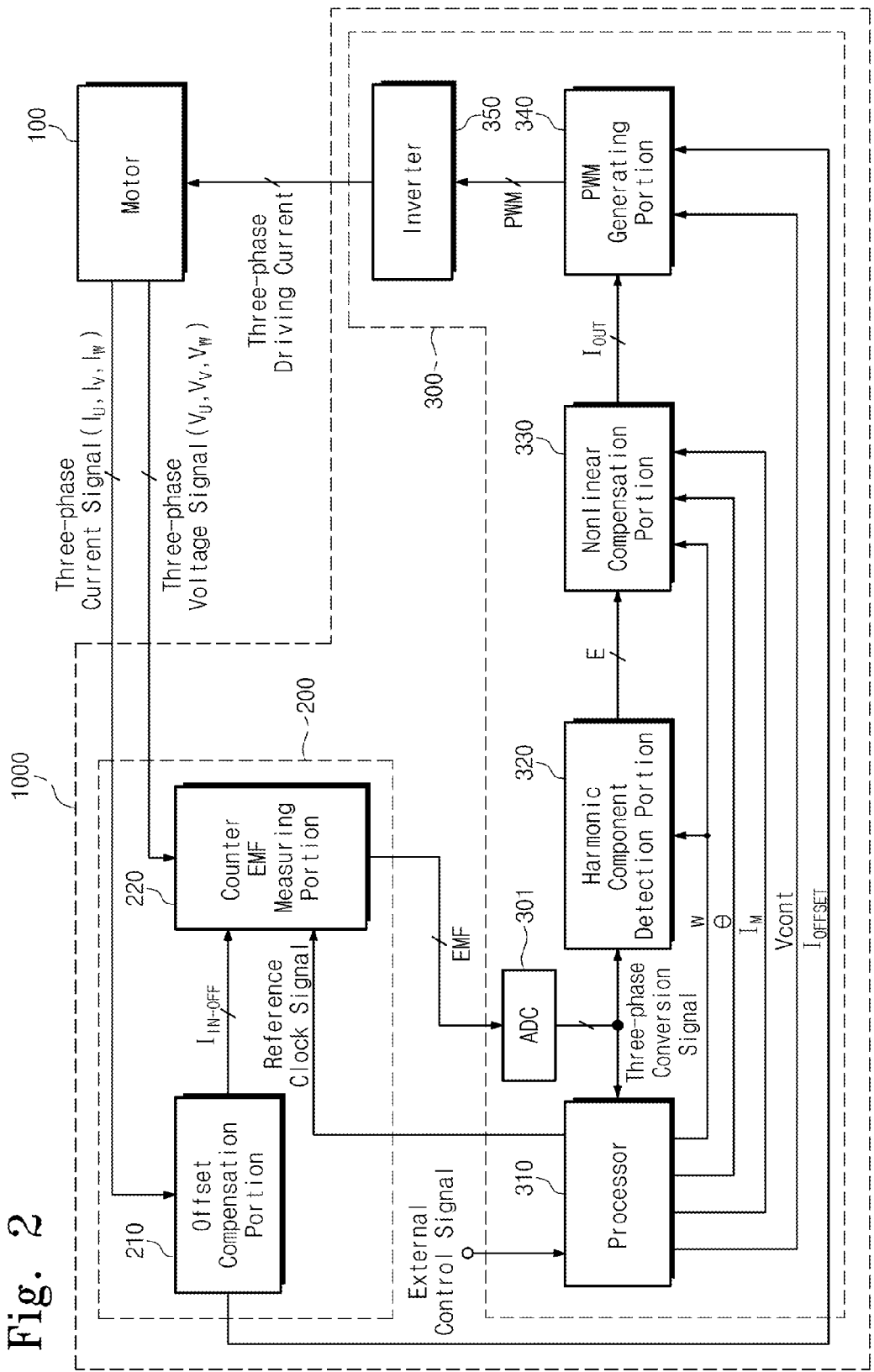
FIG. 2 is a block diagram illustrating the motor control apparatus illustrated in FIG. 1 in detail.

FIG. 2 is a block diagram illustrating the motor control device 1000 illustrated in FIG. 1 in detail. Referring to FIG. 2, the preprocessing portion 200 includes an offset compensation portion 210 and a counter electromotive force measuring portion 220. The control portion 300 includes an AD converter 301, a processor 310, a harmonic component detection portion 320, a nonlinear compensation portion 330, a PWM generating portion 340 and a three-phase inverter 350.

The offset compensation portion 210 receives three-phase current signals ($I_U$, $I_V$, $I_W$). The offset compensation portion 210 detects an offset of the received three-phase current signals ($I_U$, $I_V$, $I_W$). The detected offset is provided to the PWM generating portion 340 as a three-phase current offset ($I_{OFFSET}$). Also, the offset compensation portion 210 compensates an offset in the received three-phase current signals. The three-phase current signals of which offsets are compensated are provided to the counter electromotive force measuring portion 220 as a three-phase reference current signal ($I_{IN-OFF}$).

The counter electromotive force measuring portion 220 receives three-phase voltage signals ($V_U$, $V_V$, $V_W$), the three-phase reference current signal ($I_{IN-OFF}$) and a reference clock signal. The reference clock signal is a clock signal with which the counter electromotive force measuring portion 220 is provided from the processor 310. The counter electromotive force measuring portion 220 calculates a three-phase counter electromotive force (EMF) of motor with reference to the received three-phase voltage signals ($V_U$, $V_V$, $V_W$), the three-phase reference current signal ($I_{IN-OFF}$) and a reference clock signal. The calculation of the three-phase counter electromotive force (EMF) is performed by an analog arithmetic operation. The counter electromotive force measuring portion 220 provides the calculated three-phase counter electromotive force (EMF) to the AD converter 301.

The AD converter 301 receives the three-phase counter electromotive force (EMF) from the counter electromotive force measuring portion 220. Since the three-phase counter electromotive force (EMF) provided from counter electromotive force measuring portion 220 is an analog signal, the AD converter 301 converts the received three-phase counter electromotive force (EMF) into a digital signal. A signal converted in the AD converter 301 is output as a three-phase conversion signal.

The processor 310 calculates angular frequency (w) and a location ($\theta$) of motor by a conventional digital signal process with reference to the three-phase conversion signal. The processor 310 may directly receive angular frequency (w) and a location ($\theta$) of motor not with reference to the three-phase conversion signal. The processor 310 provides a reference clock signal and a current control signal $V_{CONT}$. When generating the current control signal $V_{CONT}$, the processor 310 may refer to an external control signal.

The harmonic component detection portion 320 calculates a three-phase counter electromotive force harmonic coefficient (E) with reference to the three-phase conversion signal. The nonlinear compensation portion 330 performs a nonlinear compensation for reducing a torque ripple of motor with reference to the three-phase counter electromotive force harmonic coefficient (E).

The nonlinear compensation portion 330 provides the compensated result as a three-phase compensation current $I_{OUT}$. The PWM generating portion 340 generates a three-phase PWM pulse (PWM) with reference to the three-phase compensation current $I_{OUT}$ and provides a three-phase driving current driving a motor with reference to the three-phase PWM pulse (PWM).

Hereinafter, among the constituent elements, a specific constitution and a detail operation of the offset compensation portion 210, the back electromagnetic force 220, the harmonic component detection portion 320, the nonlinear compensation portion 330 and the PWM generating portion 340 are described.

The processor 310 is an arithmetic operational unit used in a digital signal process and various kinds of arithmetic operational units may exist. Functions of the AD converter 301 and the three-phase inverter 350 are clear and things which the AD converter 301 and the three-phase inverter 350 refer to are also clear. A specific constitution of the processor 310, the AD converter 301 and the three-phase inverter 350 is well known in a relevant technology field, a special description of them is omitted. Each phase of the three-phase circuit may be expressed by writing down U, V, W together with each page or writing in subscripts. Also, each phase of the three-phase circuit may be expressed by writing down (U), (V), (W) together with each page or writing in subscripts.

Figure 3:
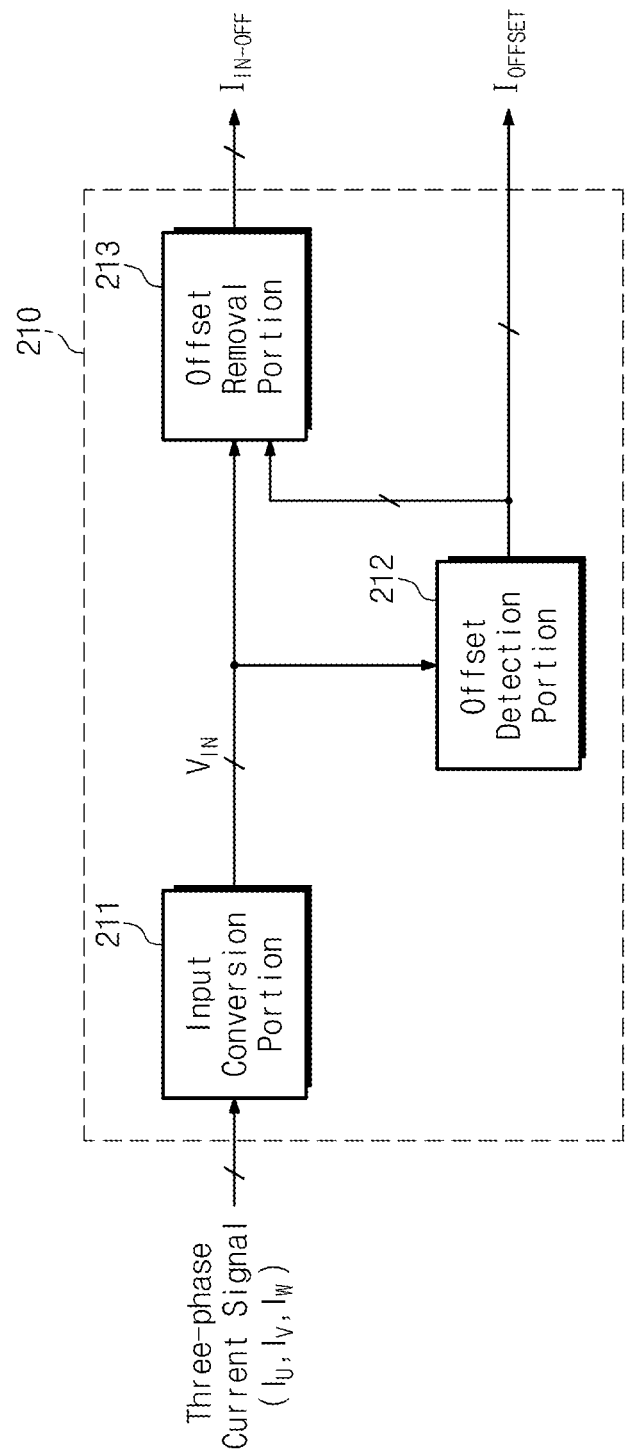
FIG. 3 is a block diagram illustrating an offset compensation portion illustrated in FIG. 2.

FIG. 3 is a block diagram illustrating the offset compensation portion 210 illustrated in FIG. 2 as an illustration. Referring to FIG. 3, the offset compensation portion 210 includes an input conversion portion 211, an offset detection portion 212 and an offset removal portion 213.

The input conversion portion 211 converts a three-phase current ($I_U$, $I_V$, $I_W$) being input into a voltage signal ($V_{IN}$) for performing an analog arithmetic operation. The voltage signal ($V_{IN}$) represents the amount or sign of the three-phase current ($I_U$, $I_V$, $I_W$). The converted voltage signal ($V_{IN}$) is provided to the offset detection portion 212 and the offset removal portion 213.

The offset detection portion 212 detects an offset of the voltage signal ($V_{IN}$) and outputs the detected offset as a three-phase current offset ($I_{OFFSET}$). The offset removal portion 213 removes a three-phase current offset ($I_{OFFSET}$) from the voltage signal ($V_{IN}$). The offset removal portion 213 provides a voltage signal from which an offset is removed as a three-phase reference current signal ($I_{IN-OFF}$).

Figure 4:
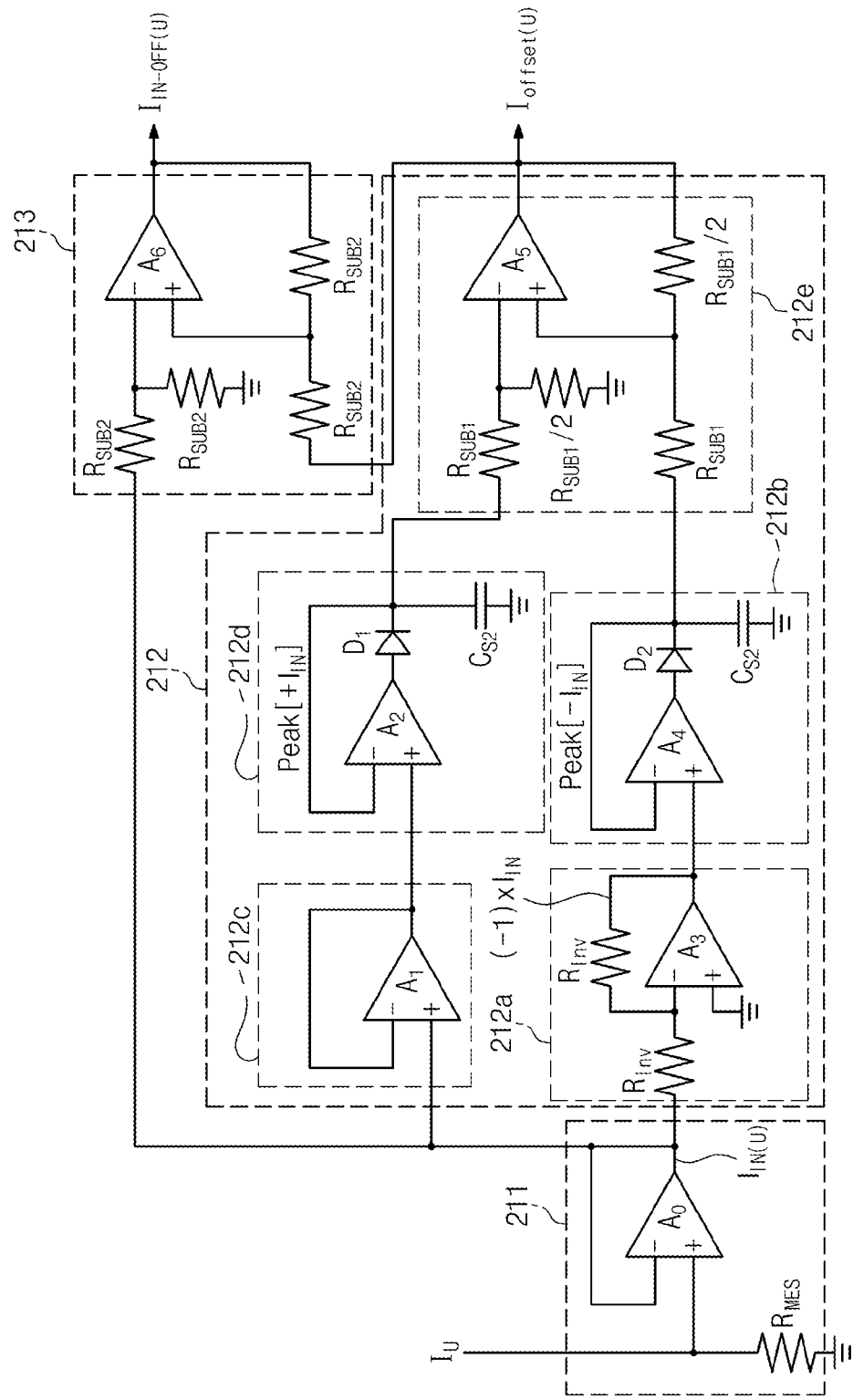
FIG. 4 is a circuit diagram illustrating a specific circuit constitution of the offset compensation portion illustrated in FIG. 3.

FIG. 4 is a circuit diagram illustrating a specific circuit constitution of the offset compensation portion 210. The offset compensation portion 210 has a three-phase signal as an input or an output, but a circuit constitution or circuit operation in each phase is the same. Thus, hereinafter, the description of one phase is provided.

Referring to FIG. 4, the input conversion portion 211 receives a phase current signal ($I_U$) as an input. The phase current signal ($I_U$) received to the input conversion portion 211 is converted into a voltage signal ($V_{IN(U)}$). The input conversion portion 211 may include one operating amplifier ($A_0$) and one ground resistor ($R_{MES}$). When the phase current signal ($I_U$) flows through the ground resistor ($R_{MES}$), a voltage signal ($V_{IN(U)}$) having the same amount and sign with the phase current signal ($I_U$)×the ground resistor ($R_{MES}$) is applied to a positive terminal of the operating amplifier ($A_0$). The voltage signal ($V_{IN(U)}$) becomes an output of the input conversion portion 211. If $R_{MES}=1\Omega$, an amplitude of the voltage signal ($V_{IN(U)}$) is equal to the amount of the phase current signal ($I_U$). An output of the input conversion portion 211 is transmitted to the offset detection portion 212.

The offset detection portion 212 includes a buffer 212c, an inverting amplifier 212a, a first peak value detector 212b, a second peak value detector 212d and a subtractor 212e. A voltage signal ($V_{IN(U)}$) input to the offset detection portion 212 flows through two paths. A voltage signal ($V_{IN(U)}$) flowing one path of the two paths is converted into a signal (peak[$-I_{IN(U)}$]) representing a negative peak value of the voltage signal ($V_{IN(U)}$) received through the inverting amplifier 212a and the first peak value detector 212b. A voltage signal ($V_{IN(U)}$) flowing the other path of the two paths is converted into a signal (peak[$+I_{IN(U)}$]) representing a positive peak value of the voltage signal ($V_{IN(U)}$) received through the buffer 212c and the second peak value detector 212d.

Operating amplifiers ($A_2$, $A_4$) included in the first and second peak detectors 212b and 212d operate as a voltage drop reduction circuit reducing a voltage drop occurring at both terminals of diodes $D_1$ and $D_2$. A voltage drop of both terminals of diode is reduced by a magnification of gain of the operating amplifier by disposing a diode between an output of the operating amplifier and the negative terminal of operating amplifier. Assume that originally, a voltage drop between both terminals of diode is 0.5V and a gain of the operating amplifier is A. At this time, if constituting a circuit such as the peak detectors 212b and 212d of FIG. 4, a voltage drop of both terminals of diode becomes 0.5/A V.

The subtractor 212e reduces the negative peak value signal (peak[$-I_{IN(U)}$]) from the positive peak value signal (peak[$+I_{IN(U)}$]). The substracter 212e provides the reduction result as a phase current offset ($I_{OFFSET\ (U)}$). The substracter 212e may output a phase current offset ($I_{OFFSET\ (U)}$) like a mathematical formula 18 by selecting resistances illustrated in FIG. 4.

[mathematical formula 18]

$$I_{OFFSET(U)} = \frac{\text{Peak}[+I_{IN(U)}] - \text{Peak}[-I_{IN(U)}]}{2}.$$

The offset removal portion 213 reduces the phase current offset ($I_{OFFSET\ (U)}$) from an output of the input conversion portion 211. The reduction result is equal to the phase current signal ($I_U$) from which an offset is removed. The offset removal portion 213 provides the reduction result as a reference current signal ($I_{IN-OFF(U)}$).

Figure 5:
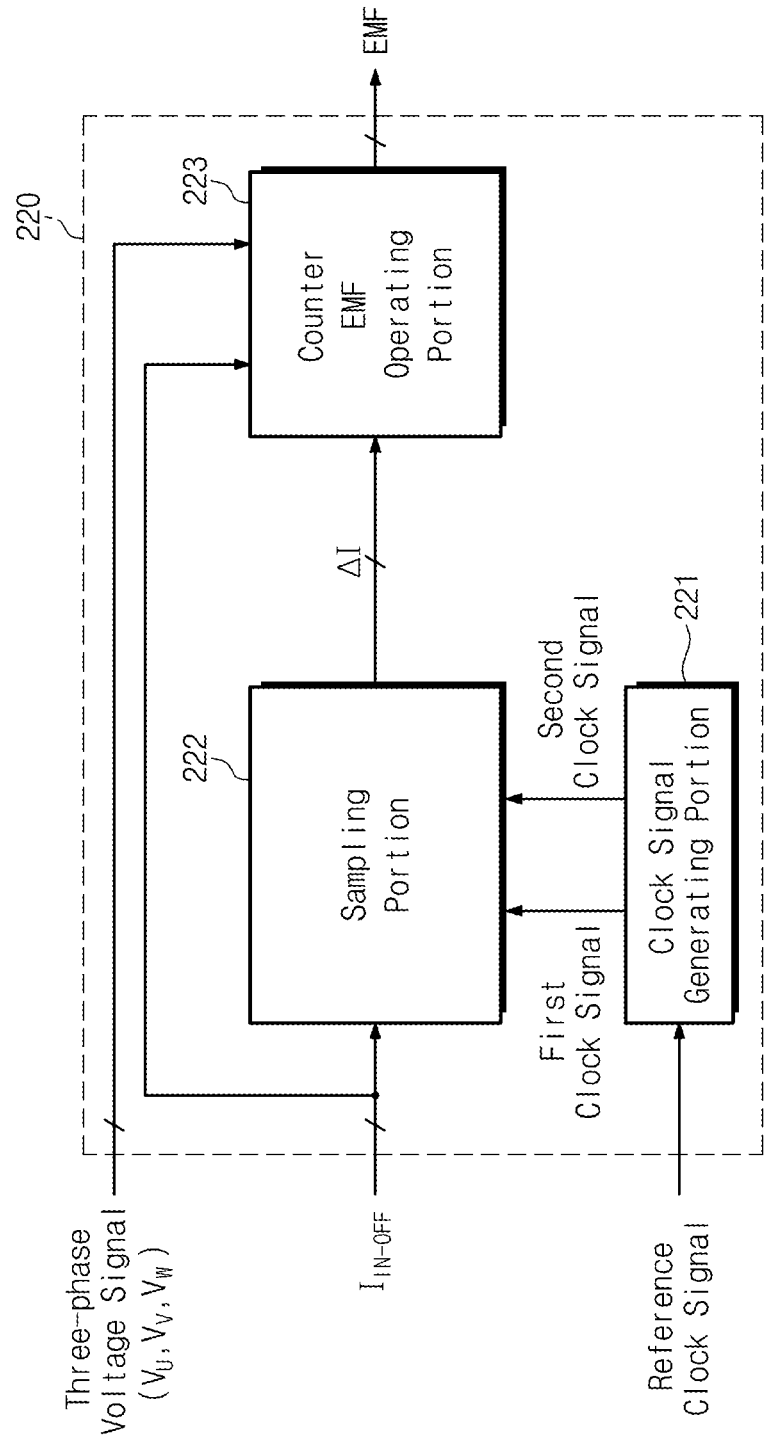
FIG. 5 is a block diagram illustrating a counter electromotive force measuring portion illustrated in FIG. 2.

FIG. 5 is a block diagram illustrating the counter electromotive force measuring portion 220 illustrated in FIG. 2. Referring to FIG. 5, the counter electromotive force measuring portion 220 includes a sampling portion 222 and a counter electromotive force operating portion 223. The counter electromotive force measuring portion 220 further includes a clock signal generating portion 221 providing a clock signal to the sampling portion 222.

The clock signal generating portion 221 receives a reference clock signal and outputs a first clock signal and a second clock signal. The first and second clock signals do not have a high value at the same time.

The sampling portion 222 receives a three-phase reference current signal ($T_{IN-OFF}$). The sampling portion 222 samples the three-phase reference current signal ($T_{IN-OFF}$) at every predetermined period. The sampling portion 222 compares the sampled three-phase reference current signal ($I_{IN-OFF}$) with the three-phase reference current signal ($I_{IN-OFF}$) sampled at a previous period to output a difference between them as a three-phase current differential signal ($\Delta I$).

The counter electromotive force operating portion 223 calculates a three-phase counter electromotive force (EMF) with reference to the three-phase reference current signal ($I_{IN-OFF}$), the three-phase current differential signal ($\Delta I$) and the three-phase voltage signal ($V_U$, $V_V$, $V_W$).

Figure 6:
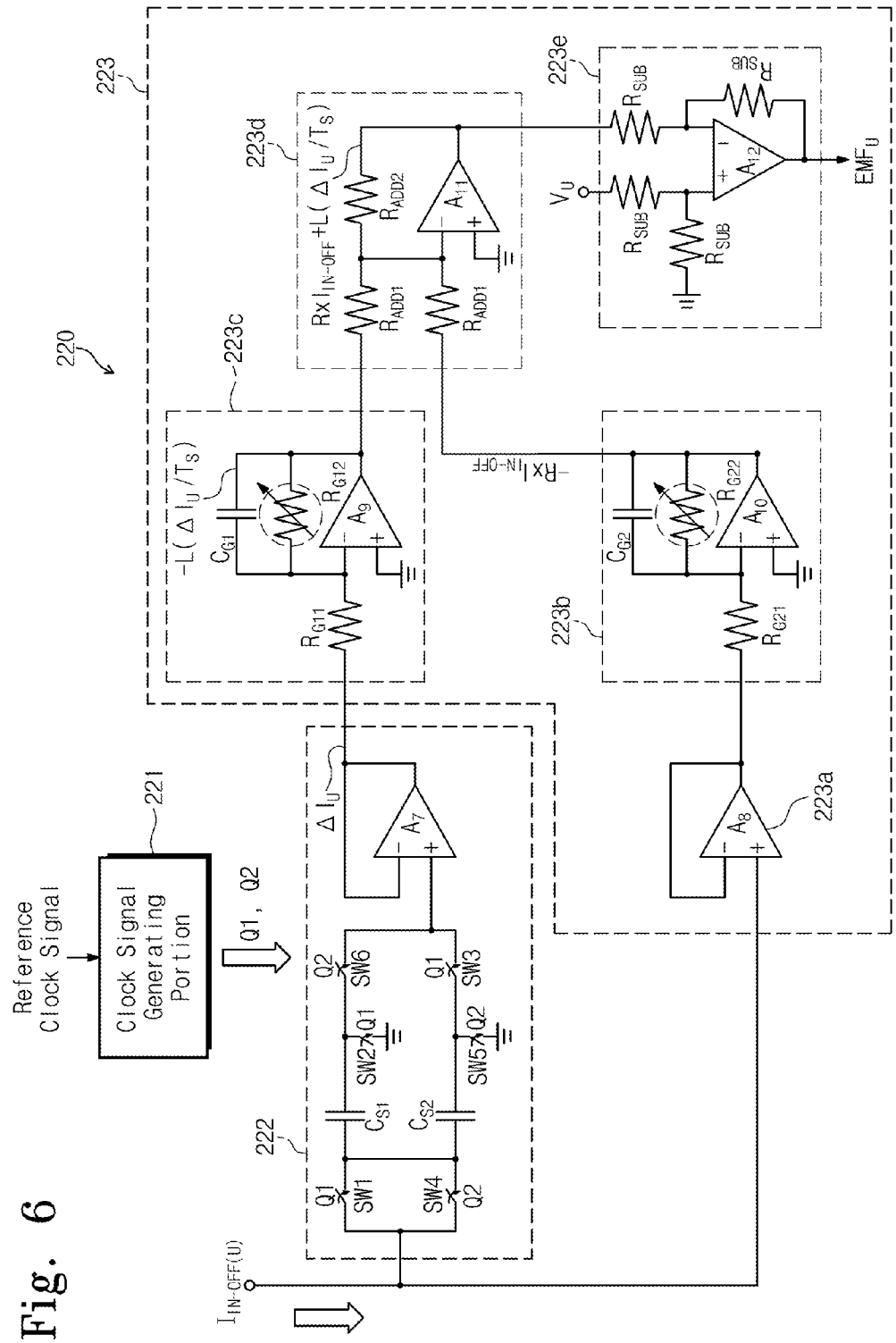
FIG. 6 is a circuit diagram illustrating a specific circuit constitution of the counter electromotive force measuring portion illustrated in FIG. 5.

FIG. 6 is a circuit diagram illustrating a specific circuit constitution of the counter electromotive force measuring portion 220 illustrated in FIG. 5. The counter electromotive force measuring portion 220 has a three-phase signal as an input and an output, but a circuit constitution or circuit operation in each phase is the same. Thus, hereinafter, the description of one phase is provided.

Referring to FIG. 6, the clock signal generating portion 221 provides a first clock signal Q1 and a second clock signal Q2 to the sampling portion 222 with reference to the reference clock signal. The sampling portion 222 includes six switches (SW1, SW2, SW3, SW4, SW5, SW6), two capacitors ($C_{S1}$, $C_{S2}$) and one operating amplifier ($A_7$).

The switches (SW1, SW2, SW3) operate in synchronization with the first clock signal Q1. The switches (SW1, SW2, SW3) are closed when the first clock signal Q1 is high and are open when the first clock signal Q1 is low. The switches (SW1, SW2, SW3) operate in synchronization with the second clock signal Q2. The switches (SW1, SW2, SW3) are closed when the second clock signal Q2 is high and are open when the second clock signal Q2 is low.

The sampling portion 222 receives the reference current signal ($I_{IN-OFF(U)}$). The sampling portion 222 samples the reference current signal ($I_{IN-OFF(U)}$) according to operations of the six switches (SW1, SW2, SW3, SW4, SW5, SW6). The sampling portion 222 compares the reference current signal ($I_{IN-OFF(U)}$) with the reference current signal ($I_{IN-OFF(U)}$) sampled at a previous period to output a difference between them as a phase current differential signal ($\Delta I_U$). If one period is Ts and present time t is $t_0$, the output ($\Delta I_U$) of the sampling portion 222 becomes $I_{IN-OFF(U)}(t_0) - I_{IN-OFF(U)}(t_0-Ts)$. An operational principle of the sampling portion 222 will be described in further detail together with 7A, 7B, 7C and 7D.

Referring to FIG. 6, a counter electromotive force operating portion 223 includes a first amplifier 223b, a second amplifier 223c, an adder 223d and a subtractor 223e. The counter electromotive force operating portion 223 may further include a buffer 223a. When assuming that a resistance of each phase is the same with R, if substituting the mathematical formula 4 for the mathematical formula 3, a mathematical formula 19 is derived. Since a dynamic equation in each phase is the same, only single-phase is considered.

[mathematical formula 19]

$$V_U = R \times I_U + \sum_{j=U,V,W} L_{jU} \frac{dI_j}{dt} + g(\theta) \times \omega$$

$$= R \times I_U + L_{UU} \frac{dI_U}{dt} + L_{VU} \frac{dI_V}{dt} + L_{WU} \frac{dI_W}{dt} + g(\theta) \times \omega$$

Herein, $\omega = d\theta/dt$. The sum ($I_U + I_V + I_W$) of each phase current in a phase motor is zero. It is assumed that self inductance of each phase is $L_S$ and is the same ($L_{UU} = L_S$). It is assumed that mutual inductance between phases is uniform regardless of a location of rotor ($L_{VU} = L_{WU} = M$). If substituting the above assumption to write the mathematical formula 19 again, a mathematical formula 20 is derived.

[mathematical formula 20]

$$V_U = R \times I_U + L_S \frac{dI_U}{dt} + M\frac{dI_V}{dt} + M\frac{dI_W}{dt} + g(\theta) \times \omega$$

$$= R \times I_U + L_S \frac{dI_U}{dt} + M\frac{d(I_V + I_W)}{dt} + g(\theta) \times \omega$$

$$= R \times I_U + L_S \frac{dI_U}{dt} - M\frac{dI_U}{dt} + g(\theta) \times \omega$$

$$= R \times I_U + L\frac{dI_U}{dt} + g(\theta) \times \omega$$

Herein, $L=L_S-M$. Since the far right section of the mathematical formula 20 is a counter electromotive force, a counter electromotive force ($EMF_U$) being generated in a motor may be represented by a mathematical formula 21.

$$EMF_U = V_u - R \times I_U - L\frac{dI_U}{dt} \qquad \text{[mathematical formula 21]}$$

Herein, $V_U$ is a phase voltage of motor, $I_U$ is a phase current of motor, R is a phase resistance of motor, $L_S$ is phase self inductance of motor and M is mutual inductance between phases of motor.

As shown in the mathematical formula 21, the phase counter electromotive force ($EMF_U$) of motor is the same with the value obtained by subtracting the amount ($R \times IU$) of voltage drop by a resistor and the amount ($L \times (dI_U/dT)$) of voltage drop by inductance from the phase voltage $V_U$ of motor. The phase current $I_U$ of motor of the mathematical formula 21 is an ideal signal not considering an offset. The phase reference current signal ($I_{IN-OFF(U)}$) is the phase current signal ($I_U$) from which only the phase current offset $I_{OFFSET}$ is removed. Thus, it is considered that in the mathematical formula 21, the phase current signal ($I_U$) is the same with the phase reference current signal ($I_{IN-OFF(U)}$).

First, an operation to obtain the right second section ($R \times I_U$) of the mathematical formula 21 is described. The phase reference current signal ($I_{IN-OFF(U)}$) input into the counter electromotive force operating portion 223 is output to the adder 223d through the buffer 223a and the first amplifier 223b. The amplification magnification of the first amplifier 223b may be varied by controlling a variable resistor $R_{G22}$. Thus, if controlling the variable resistor $R_{G22}$ so that R becomes $R_{G22}/R_{G21}$ (hereinafter it is called a first amplification magnification), an output (hereinafter it is called a first inverting output) of the first amplifier 223b becomes $-R \times I_{IN-OFF(U)}$. At this time, R is a resistance component of the motor. A capacitor $C_{G2}$ included in the first amplifier 223b is added to perform a low pass filtering.

Next, an operation to obtain the right third section ($L \times (dI_U/dT)$) of the mathematical formula 21 is described. Since $I_U = I_{IN-OFF(U)}$, a derived function ($dI_U/dT$) of the phase current $I_U$ may be approximated like a mathematical formula 22.

When Ts→0, $$dI_U/dt \approx [I_{IN-OFF(U)}(t_0) - I_{IN-OFF(U)}(t_0-Ts)]/Ts = \Delta I_U/Ts \qquad \text{[mathematical formula 22]}$$

In the above formula, Ts is a period at which the sampling portion 222 samples the reference current signal, $\Delta I_U$ is an output of the sampling portion 222. A phase current differential signal ($\Delta I_U$) input into the counter electromotive force operating portion 223 is output to the adder 223d through the second amplifier 223c. An amplification magnification of the second amplifier 223c may be varied by controlling a variable resistor $R_{G12}$. If controlling the variable resistor $R_{G12}$ so that $L/Ts$ becomes $R_{G12}/R_{G11}$ (hereinafter it is called a second amplification magnification), an output (hereinafter it is called a second inverting output) of the second amplifier 223c becomes $-L \times (\Delta I_U/Ts)$. At this time, L is an inductor component of the motor. A capacitor $C_{G1}$ included in the second amplifier 223c is added to perform a low pass filtering.

The adder 223d adds the first inverting output and the second inverting output to output them to the subtractor 223e. At this time, an output of the adder 223d becomes $R \times I_{IN-OFF(U)} + L \times (\Delta I_U/Ts)$. The subtractor 223e subtracts the output of the adder 223d from the phase voltage signal ($V_U$). At this time, an output of the subtractor 223e becomes $V_U - R \times I_{IN-OFF(U)} + L \times (\Delta I_U/Ts)$. Since the phase voltage signal $V_U$ and the phase voltage $V_U$ are the same, a circuit constitution of the mathematical formula 21 is completed.

The counter electromotive force operating portion 223 provides an output of the subtractor 223e as a phase counter electromotive force ($EMF_U$). An operation to obtain a counter electromotive force is performed in the preprocessing portion 200 by an analog signal. As a result, the amount of operations to be performed by a digital processor in the control portion is reduced and a cost of control system of motor may be reduced.

Figure 7A:
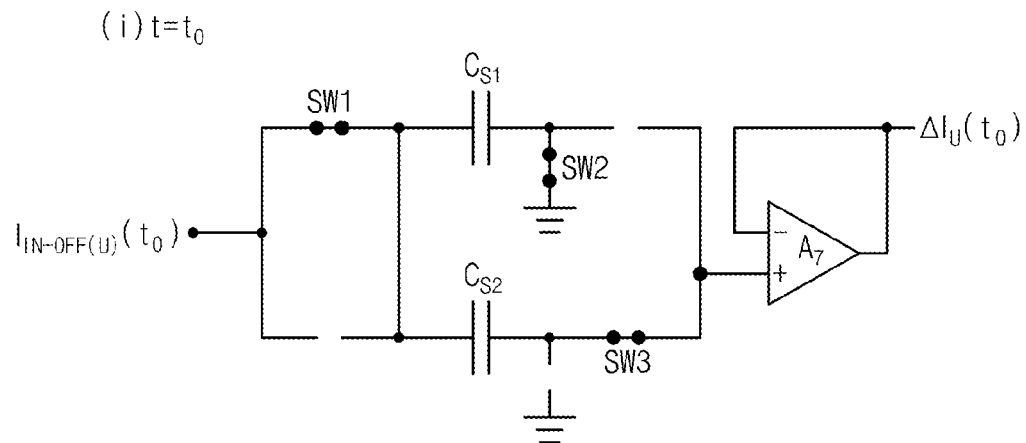
FIG. 7A is a conceptual diagram for describing a current sampling operation at $t=t_0$ of a sampling portion illustrated in FIG. 6.
Figure 7B:
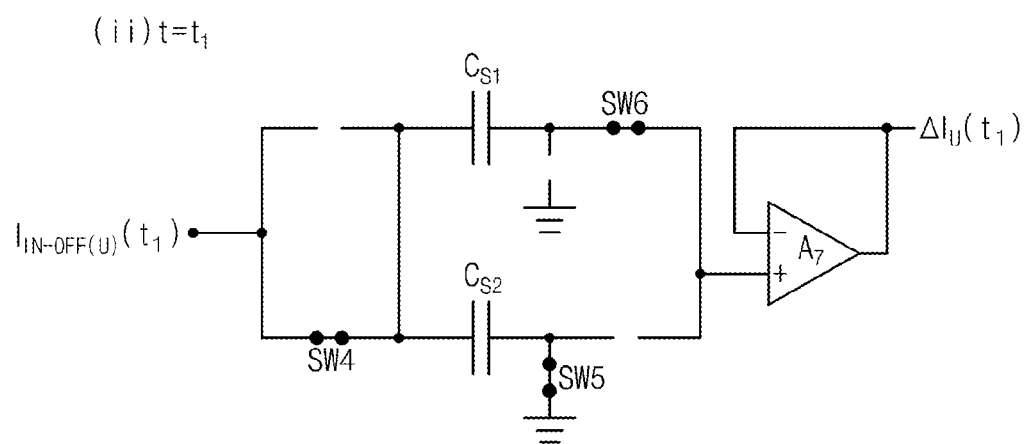
FIG. 7B is a conceptual diagram for describing a current sampling operation at $t=t_1$ of a sampling portion illustrated in FIG. 6.
Figure 7C:
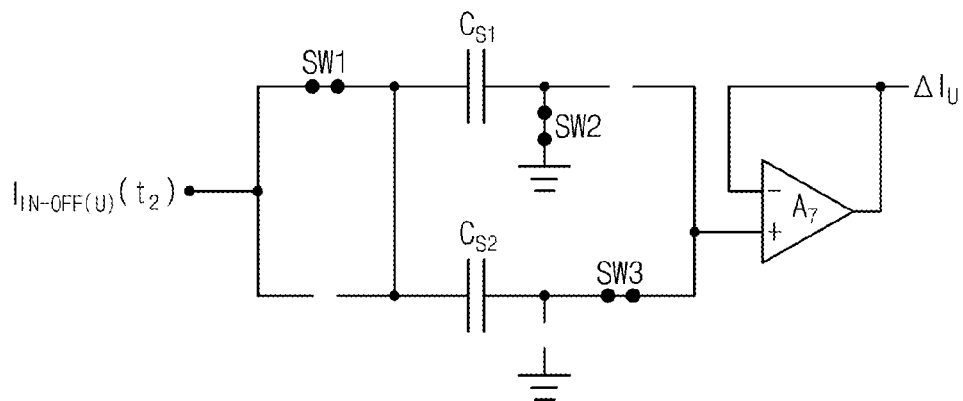
FIG. 7C is a conceptual diagram for describing a current sampling operation at $t=t_2$ of a sampling portion illustrated in FIG. 6.
Figure 7D:
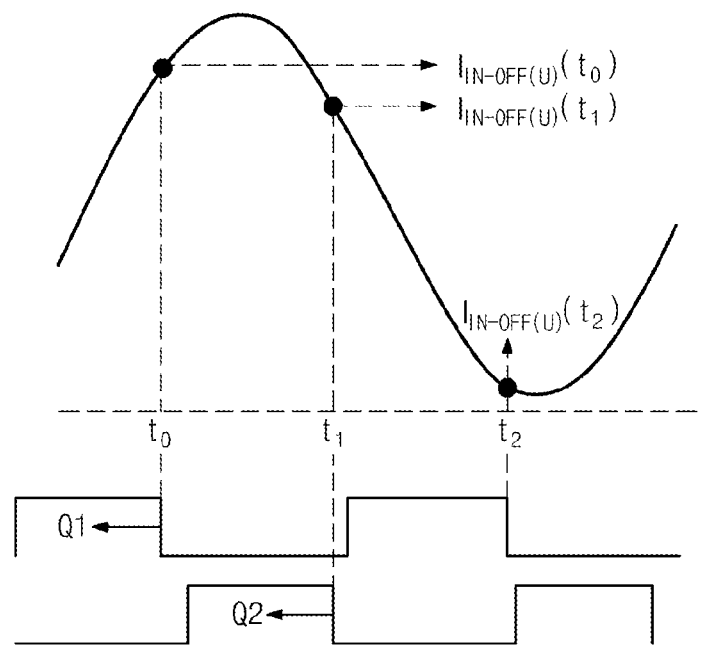
FIG. 7D is a waveform illustrating a sampling operation of the sampling portion illustrated in FIG. 6.

In FIGS. 7A, 7B, 7C and 7D, an operation of the sampling portion 222 is illustrated in further detail. FIG. 7A shows a circuit diagram of the sampling portion 222 when $t=t_0$, FIG. 7B shows a circuit diagram of the sampling portion 222 when $t=t_1$ and FIG. 7C shows a circuit diagram of the sampling portion 222 when $t=t_2$. FIG. 7D is a waveform diagram of the first clock signal Q1, the second clock signal Q2 and the reference current signal.

Referring to FIG. 7A, since the first clock signal Q1 is high and the second clock signal Q2 is low before $t=t_0$, the switches SW1, SW2 and SW3 are closed and the switches SW4, SW5 and SW6 are open. Since the amount of charges accumulated in the capacitor is a value obtained by multiplying a voltage of both terminals of capacitor by capacitance of capacitor, the amount $Q_{S1}(t_0)$ of charges accumulated in a capacitor $C_{S1}$ at $t=t_0$ may be expressed by a mathematical formula 23.

$$Q_{S1}(t_0) = C_{S1} \times [I_{IN-OFF(U)}(t_0) - 0] \qquad \text{[mathematical formula 23]}$$

After $t=t_0$, the first clock signal Q1 becomes low and the switches SW1, SW2 and SW3 are open. If the SW2 is open, an output terminal of the capacitor $C_{S1}$ is connected to a positive terminal of the operating amplifier ($A_7$) or is open. As a result, a current cannot flow out from the output terminal of the capacitor $C_{S1}$. Thus, when $t=t_0$, the amount of charges accumulated in the capacitor $C_{S1}$ is maintained until the first clock signal Q1 becomes high again.

Referring to FIG. 7B, when $t=t_1$, since the first clock signal Q1 is low and the second clock signal Q2 is high, the switches SW1, SW2 and SW3 are open and the switches SW4, SW5 and SW6 are closed. At this time, the amount of charges $Q_{S1}(t_1)$ accumulated in the capacitor $C_{S1}$ and the amount of charges $Q_{S2}(t_1)$ accumulated in the capacitor $C_{S2}$ may be expressed by a mathematical formula 24.

$$Q_{S1}(t_1) = C_{S1} \times [I_{IN-OFF(U)}(t_1) - \Delta I_U(t_1)]$$

$$Q_{S2}(t_1) = C_{S2} \times [I_{IN-OFF(U)}(t_1) - 0] \qquad \text{[mathematical formula 24]}$$

Since the amount of charges accumulated in the capacitor $C_{S1}$ is uniform at $t=t_0 \sim t_1$, $QS1(t0)$ becomes $Q_{S1}(t_1)$ by conservation law of electrical charges. To obtain $\Delta I(t_1)$, if the mathematical formula 23 and the mathematical formula 24 are allied, a result like a mathematical formula 25 can be obtained.

Since $Q_{S1}(t_0) = Q_{S1}(t_1)$, $$C_{S1} \times [I_{IN-OFF(U)}(t_0) - 0] = C_{S1} \times [I_{IN-OFF(U)}(t_1) \times \Delta I_U(t_1)]$$

$$\therefore \Delta I_U(t_1) = I_{IN-OFF(U)}(t_1) - I_{IN-OFF(U)}(t_0) \quad \text{[mathematical formula 25]}$$

According to the above result, an output of the sampling portion 222 is a differential value between the reference current signal ($I_{IN-OFF(U)}(t_0)$) at $t = t_0$ and the reference current signal ($I_{IN-OFF(U)}(t_1)$) at $t = t_1$.

After $t = t_1$, the second clock signal Q2 becomes low and the switches SW4, SW5 and SW6 are open. If the SW5 is open, an output terminal of the capacitor $C_{S2}$ is connected to a positive terminal of the operating amplifier ($A_7$) or is open. As a result, a current cannot flow out from the output terminal of the capacitor $C_{S2}$. Thus, when $t = t_1$, the amount of charges accumulated in the capacitor $C_{S2}$ is maintained until the second clock signal Q2 becomes high again.

Referring to FIG. 7C, when $t = t_2$, since the first clock signal Q1 is high and the second clock signal Q2 is low, the switches SW1, SW2 and SW3 are closed and the switches SW4, SW5 and SW6 are open. At this time, the amount of charges $Q_{S1}(t_2)$ accumulated in the capacitor $C_{S1}$ and the amount of charges $Q_{S2}(t_2)$ accumulated in the capacitor $C_{S2}$ may be expressed by a mathematical formula 26. An output ($\Delta I_U(t_2)$) of the sampling portion 222 may be expressed by a mathematical formula 27.

$$Q_{S1}(t_2) = C_{S1} \times [I_{IN-OFF(U)}(t_2) - 0]$$

$$Q_{S2}(t_2) = C_{S2} \times [I_{IN-OFF(U)}(t_2) - \Delta I_U(t_2)] \quad \text{[mathematical formula 26]}$$

Since $Q_{S2}(t_1) = Q_{S2}(t_2)$ by the conservation law of electrical charge, $$C_{S2} \times [I_{IN-OFF(U)}(t_1) - 0] = C_{S2} \times [I_{IN-OFF(U)}(t_2) - \Delta I_U(t_2)]$$

$$\therefore \Delta I_U(t_2) = I_{IN-OFF(U)}(t_2) - I_{IN-OFF(U)}(t_1) \quad \text{[mathematical formula 27]}$$

Similarly, an output of the sampling portion 222 is a differential value between the reference current signal ($I_{IN-OFF(U)}(t_1)$) at $t = t_1$ and the reference current signal ($I_{IN-OFF(U)}(t_2)$) at $t = t_2$.

FIG. 7D is a schematic view showing a sampling operation of the sampling portion illustrated in FIG. 6. Referring to FIG. 7D, a reference current signal (IIN-OFF(U)) is sampled at a falling edge ($t = t_0$ or $t = t_2$) of the first clock signal Q1 or a falling edge ($t = t_1$) of the second clock signal Q2.

Figure 8:
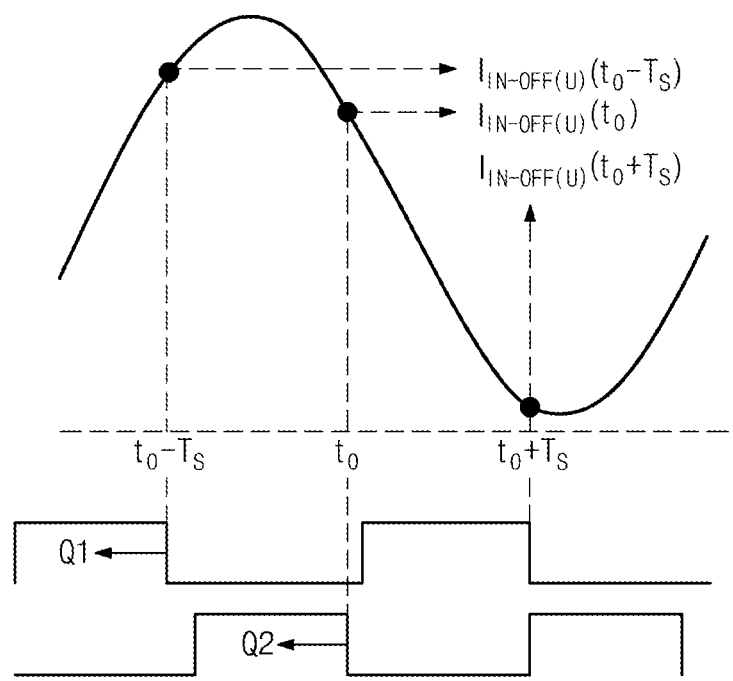
FIG. 8 is a waveform diagram representing the waveform illustrated in FIG. 7D again considering a sampling period.

FIG. 8 is a waveform that the schematic view illustrated in FIG. 7D is illustrated again considering a sampling period (Ts). In FIG. 8, an interval between a falling edge of the first clock signal Q1 and a falling edge of the second clock signal Q2 is controlled to have a specific period (Ts). After controlling the interval, the sampling portion 222 outputs a phase differential signal ($\Delta I_U$) at every period (Ts).

Figure 9:
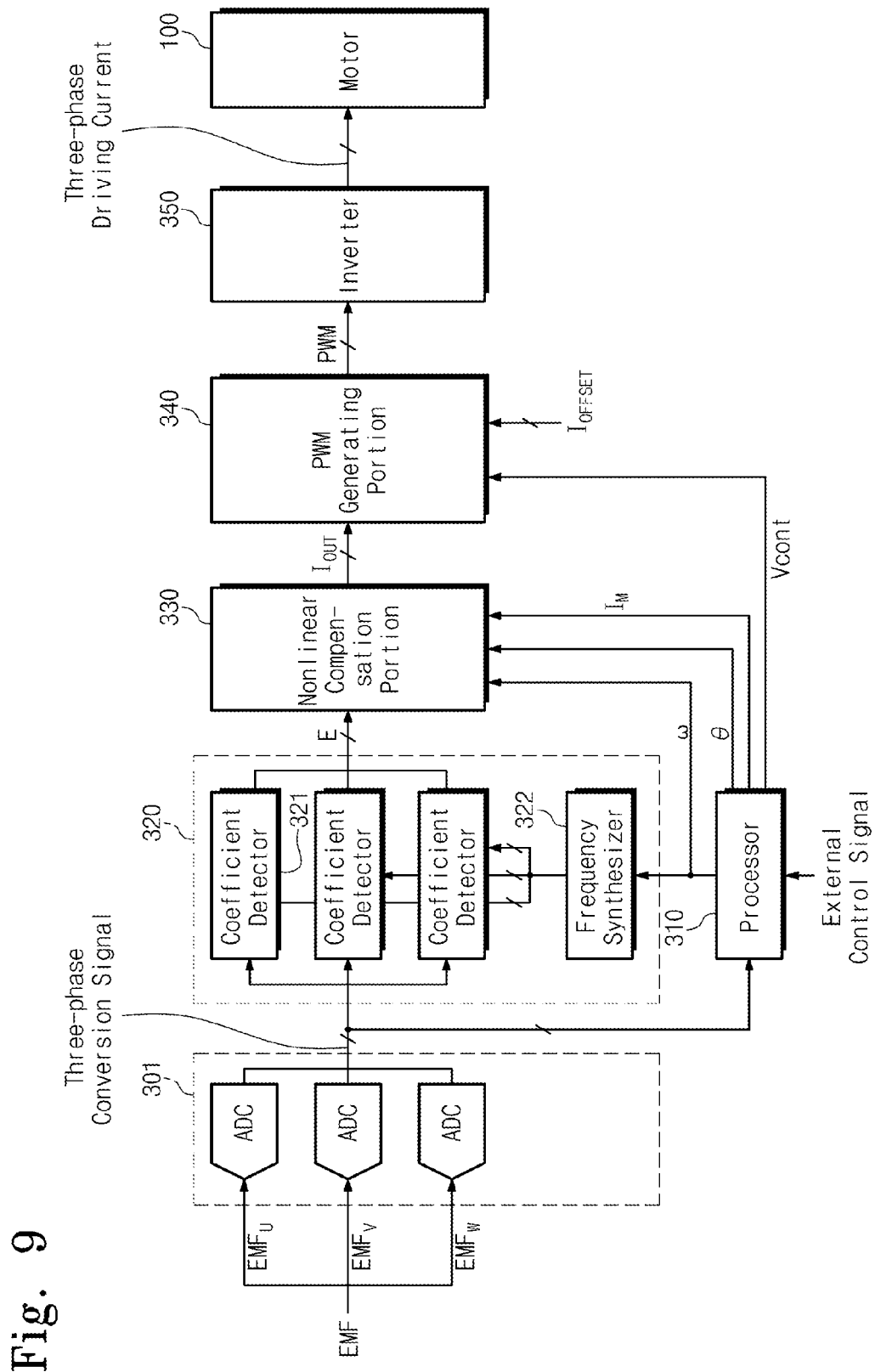
FIG. 9 is a block illustrating a control portion illustrated in FIG. 2.

FIG. 9 is a block diagram illustrating the control portion illustrated in FIG. 2. Referring to FIG. 9, the control portion 300 includes an AD converter 301, a processor 310, a harmonic component detection portion 320, a nonlinear compensation portion 330, a PWM generating portion 340 and a three-phase inverter 350.

The AD converter 301 receives a three-phase counter electromotive force (EMF) from the preprocessing portion 200 to convert it into a digital signal. The signal converted in the AD converter 301 is output as a three-phase conversion signal.

The processor 310 calculates and provides a rotation angular frequency ($\omega$) and a location ($\theta$) of motor with reference to the three-phase conversion signal. Also, the processor 310 provides a reference clock signal and a current control signal ($V_{CONT}$).

The harmonic component detection portion 330 calculates three-phase counter electromotive force harmonic coefficients ($E_U$, $E_V$, $E_W$) with reference to the three-phase conversion signal.

The nonlinear compensation portion 330 performs a nonlinear compensation to reduce torque ripple of motor with reference to the three-phase counter electromotive force harmonic coefficients ($E_U$, $E_V$, $E_W$). The nonlinear compensation portion 330 provides the compensated result as a three-phase compensation current signal ($I_{OUT}$).

The PWM generating portion 340 generates a three-phase PWM pulse (PWM) with reference to the three-phase compensation current signal ($I_{OUT}$), the reference clock signal and a current control signal ($V_{CONT}$) and a three-phase current offset ($I_{OFFSET}$). The three-phase inverter 350 provides a three-phase driving current with reference to the three-phase PWM pulse (PWM). The three-phase driving current drives the motor.

Figure 10:
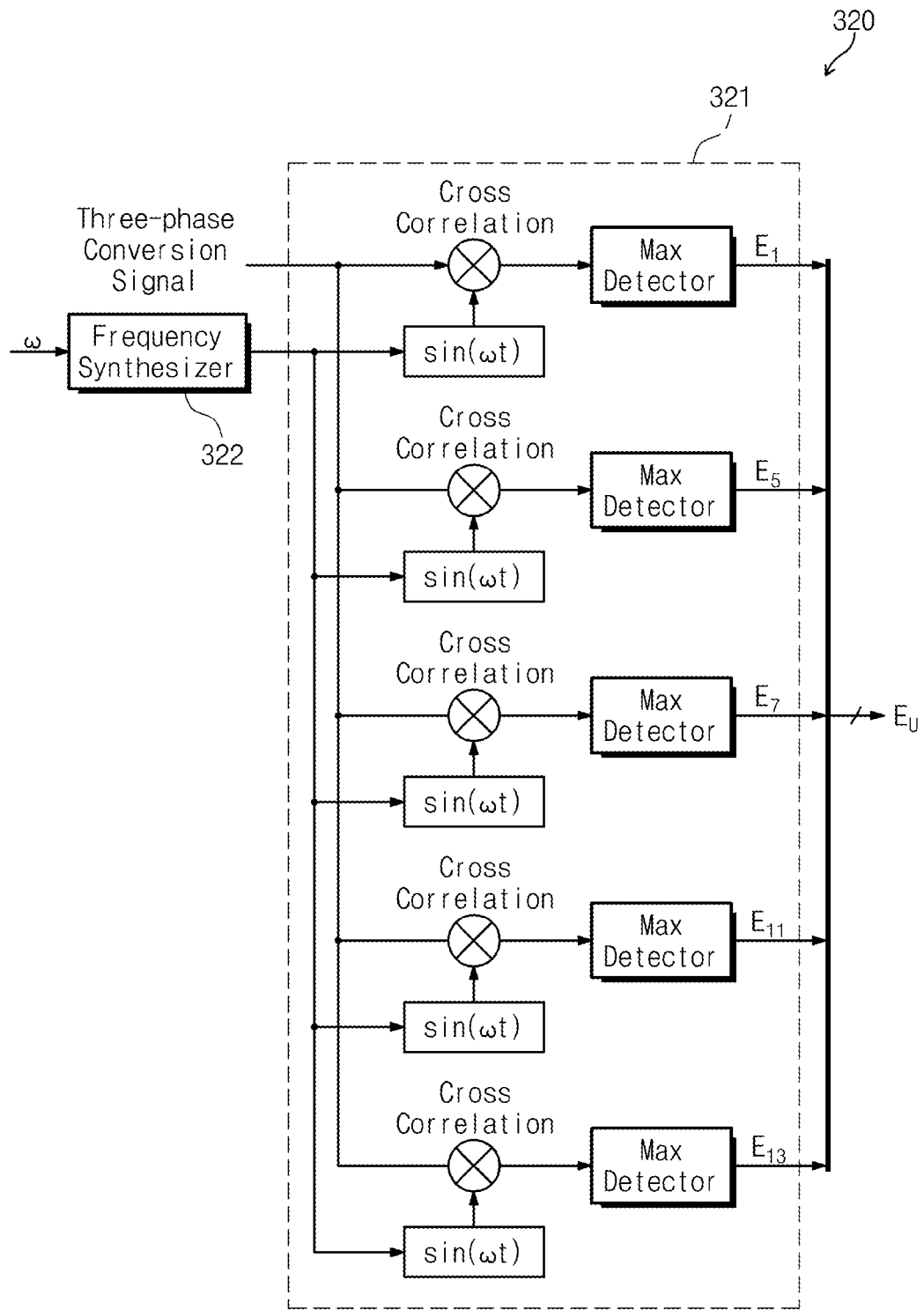
FIG. 10 is a block diagram for describing an operation of harmonic coefficient detection portion illustrated in FIG. 9.

FIG. 10 is a block diagram for describing an operation of harmonic coefficient detection portion illustrated in FIG. 9.

The harmonic coefficient detection portion 320 has a three-phase signal as an input and an output but constituent elements of each phase and functions of the constituent elements are the same. Thus, hereinafter, the description of one phase is provided.

Referring to FIG. 10, the harmonic coefficient detection portion 320 includes a coefficient detector 321 and a frequency synthesizer 322. The frequency synthesizer 322 synthesizes sine waves having first, third, fifth, seventh, eleventh and thirteenth harmonics of angular frequency (w) of motor from the processor 310 with reference to angular frequency (w) of motor. The frequency synthesizer 322 outputs the synthesized sine waves to the coefficient detector 321.

The coefficient detector 321 detects coefficients of harmonic sections of $g(\theta)$ included in the mathematical formula 8 with reference to the phase conversion signal and the synthesized sine waves. To specifically describe a process of detecting coefficients of harmonic sections, it is assumed as follows.

1) The motor operates at a constant speed. ($\omega$ = constant)
2) An initial location ($\theta_{INIT}$) of the motor is 0.

Since the location ($\theta$) of the motor is $wt + \theta_{INIT}$, the $\theta$ becomes wt by the assumption 2. The phase conversion signal means a counter electromotive force. Referring to the mathematical formulas 19 and 20, the phase conversion signal = $g(\theta) \times w$. Each phase in a three-phase motor has a phase difference of $2/3\pi$. Thus, if assume that an initial location is 0 (that is, $g(\theta) = g_U(\theta)$), $g(\theta) = g_U(\theta) = g_V(\theta - 2/3\pi) = g_W(\theta + 2/3\pi)$. Referring to the mathematical formula 8, if expressing the phase conversion signal by Fourier series with respect to $\theta$, it may be represented by a mathematical formula 28.

$$w \times g_U(\theta) = w \times g_U(wt) = w \times [E_1 \sin wt + E_3 \sin 3wt + E_5 \sin 5wt + \ldots] \quad \text{[mathematical formula 28]}$$

Herein, since the sum of three-phase current is 0, when considering the whole three-phase torque, $\sin(3n \cdot wt)$ section may be erased (n = 1, 2, 3, ...). Since the w is constant by the assumption 1), the coefficient detector 321 performs an operation of dividing the phase conversion signal by w. And, w means angular frequency of sine wave (that is, w=ω). If w is not constant as an embodiment, the coefficient detector 321 may continuously receive changing w from the DSP. At this time, the coefficient detector 321 performs an operation of dividing the phase conversion signal by the received w. The divided signal may be represented by a mathematical formula 29.

$$g_U(wt)=[E_1 \sin wt + E_5 \sin 5wt + E_7 \sin 7wt \ldots]$$ [mathematical formula 29]

The coefficient detector 321 seeks cross correlation functions between sine waves output from $g_U$(wt) and the frequency synthesizer 322 respectively. The obtained coefficients of the cross correlation functions include a coefficient of each harmonic section according to the order of sine wave. For example, a coefficient of function obtained by performing a cross correlation operation of sine wave having a first harmonic frequency becomes $E_1$. Similarly, a coefficient of function obtained by performing a cross correlation operation of sine wave having a fifth harmonic frequency becomes $E_5$. The coefficient detector 321 calculates coefficient values of the obtained cross correlation functions. The coefficient values of the obtained cross correlation functions may be obtained by measuring the maximum values of cross correlation functions. The coefficient detector 321 outputs the coefficient values of the obtained cross correlation functions as a counter electromotive force harmonic coefficient ($E_U$).

The phase counter electromotive force harmonic coefficient ($E_U$) means harmonic section coefficients of g(θ) included in the mathematical formula 8. The phase counter electromotive force harmonic coefficient ($E_U$) may include a plurality of coefficients. Also, the phase counter electromotive force harmonic coefficient ($E_U$) may be a BUS type having a plurality of coefficients. According to some embodiments, the phase counter electromotive force harmonic coefficient ($E_U$) may include first, fifth, seventh, eleventh and thirteenth harmonic coefficients ($E_1$, $E_5$, $E_7$, $E_{11}$, $E_{13}$). According to the constitution and processes, a three-phase counter electromotive force harmonic coefficient (E) needed for a nonlinear compensation may be obtained.

Figure 11:
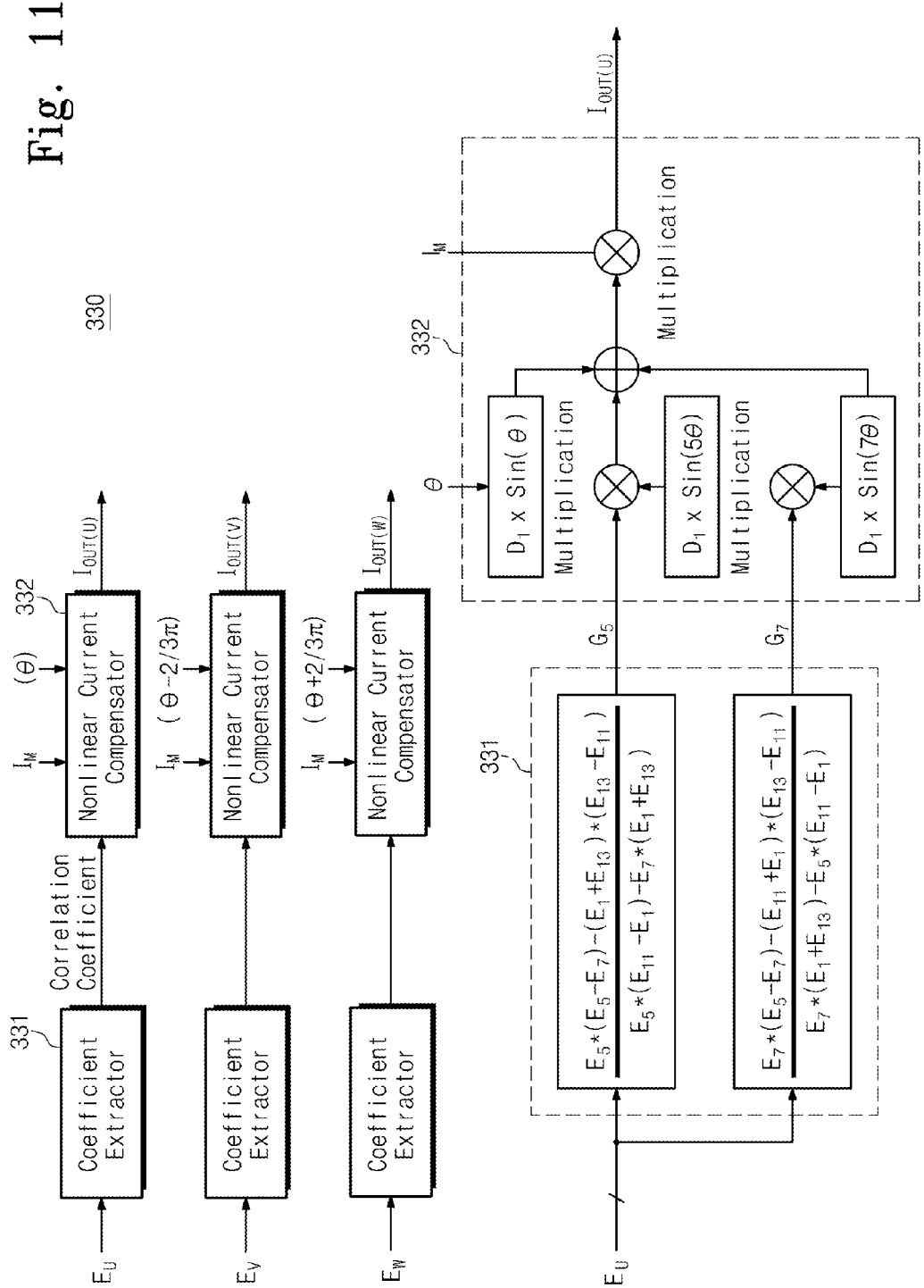
FIG. 11 is a block diagram illustrating an operation of nonlinear compensation portion illustrated in FIG. 9.

FIG. 11 is a block diagram illustrating an operation of nonlinear compensation portion illustrated in FIG. 9. The nonlinear compensation portion 330 has a three-phase signal as an input and an output but constituent elements of each phase and functions of the constituent elements are the same. Thus, hereinafter, the description of one phase is provided. A specific principle of the nonlinear compensation portion 330 is as stated in the aforementioned "inducement of compensation current minimizing a torque ripple" and "embodiments of motor control device".

Referring to FIG. 11, the nonlinear compensation portion 330 includes a correction coefficient extractor 331 and a nonlinear current compensator 332. The correction coefficient extractor 331 calculates the correction coefficients (G5, G7) included in the mathematical formula 15 with reference to the phase counter electromotive force harmonic coefficient ($E_U$). The calculated correction coefficient is provided to the nonlinear current compensator 332. The nonlinear current compensator 332 calculates the compensation current calculated in the mathematical formula 16 with reference to the location (θ) of motor, the torque command ($I_M$) and the correction coefficients (G5, G7). The torque command ($I_M$) may be input from the outside.

An algorithm of the nonlinear current compensator 332 is illustrated in FIG. 11. There is a phase difference of 2/3π between phases of the three-phase motor. There are phase differences of 2/3π and 4/3π between a location and a torque command of motor on the V phase and the W phase and a location (θ) and a torque ($I_M$) command of motor on the U phase. The compensation current calculated in the nonlinear current compensator 332 is provided as a three-phase compensation current ($I_{OUT}$). As described in the "inducement of compensation current minimizing a torque ripple", the three-phase compensation current ($I_{OUT}$) means a current signal compensated so that a torque ripple dependent on a location of motor is removed.

Figure 12:
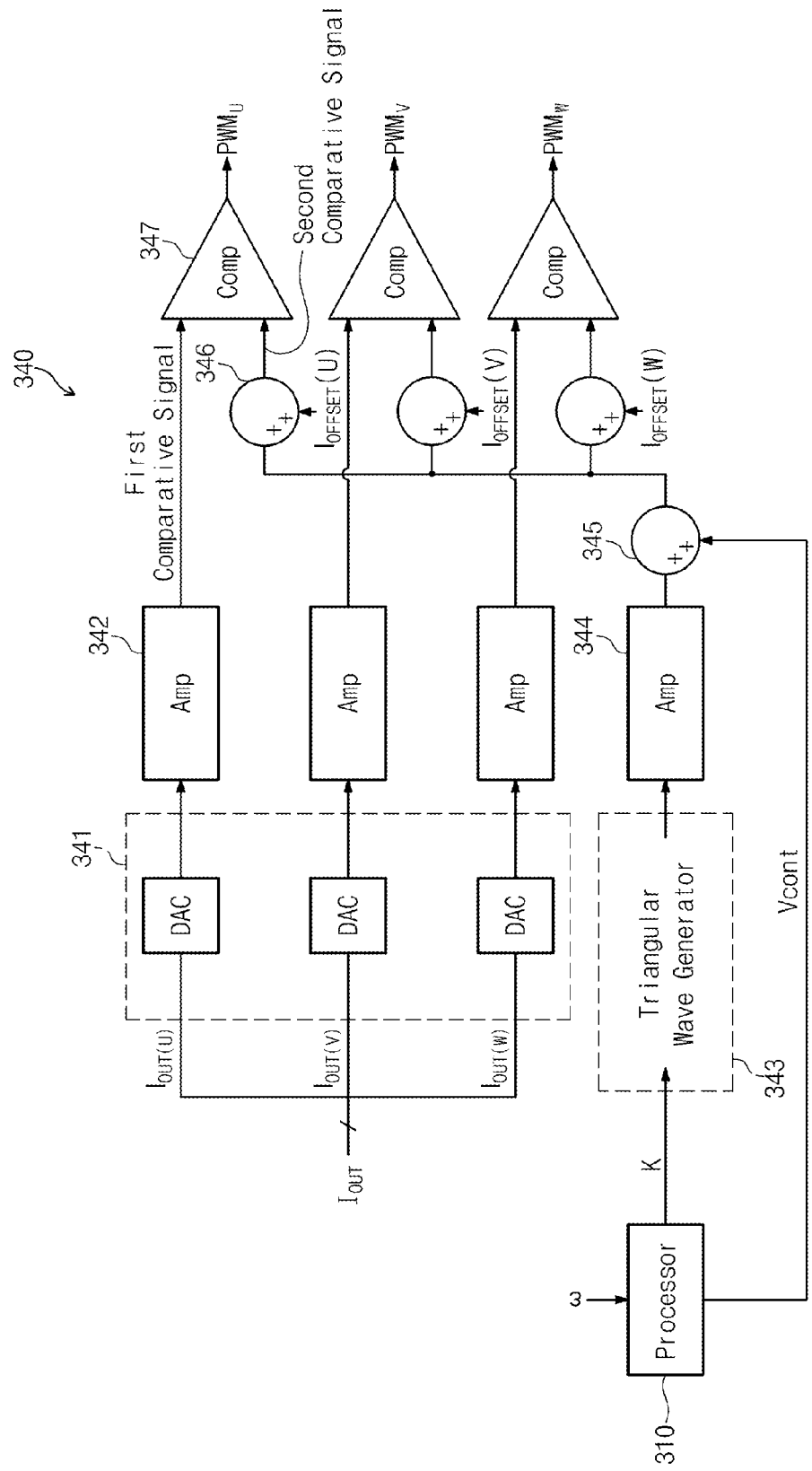
FIG. 12 is a block diagram illustrating a PWM generating portion illustrated in FIG. 9.

FIG. 12 is a block diagram illustrating a PWM generating portion illustrated in FIG. 9. The PWM generating portion 340 has a three-phase signal as an input and an output but constituent elements of each phase and functions of the constituent elements are the same. Thus, hereinafter, the description of one phase is provided.

The PWM generating portion 340 includes a sine wave generator 341, a first amplifier 342, a triangular wave generator 343, a second amplifier 344, a first adder 345, a second adder 346 and a comparator 347.

The sine wave generator 341 converts and outputs a phase compensation current ($I_{OUT(U)}$) into an analog sine wave signal. The sine wave generator 341 may include DA converters. The first amplifier 342 amplifies a signal converted in the sine wave generator 341. To remove harmonic components, the first amplifier 342 may include a low pass filter. The first amplifier 342 outputs the amplified signal as a first comparative signal.

The triangular wave generator 343 generates a triangular wave with reference to a reference signal (K) provided from the processor 310. A signal generated from the triangular wave generator 343 is amplified through the second amplifier 344. To remove harmonic components, the second amplifier 344 may include a low pass filter. In the first and second adders 345 and 346, the signal amplified in the second amplifier 344, a current control signal ($V_{CONT}$) and the phase current offset ($I_{OFFSET(U)}$) are added to be output as a second comparative signal.

The comparator 347 compares the first comparative signal and the second comparative signal with each other, and generates and outputs a phase PWM pulse ($PWM_U$) according to comparison logic. As an embodiment, the comparison logic outputs a high when the first comparative signal is higher than the second comparative signal and otherwise, outputs a low.

Figure 13:
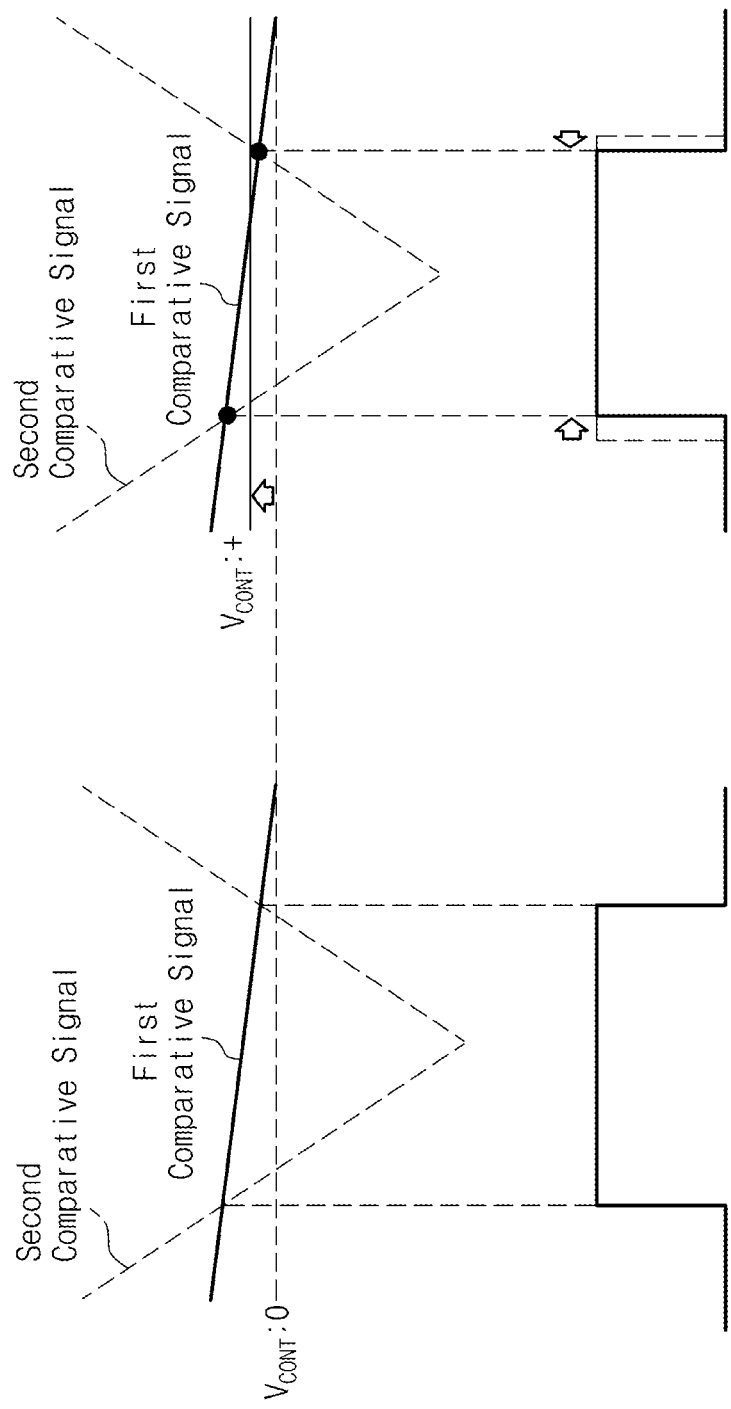
FIGS. 13 and 14 are conceptual diagrams for describing that a width of PWM output pulse is changed by a current control signal in the PWM generating portion illustrated in FIG. 12.
Figure 14:
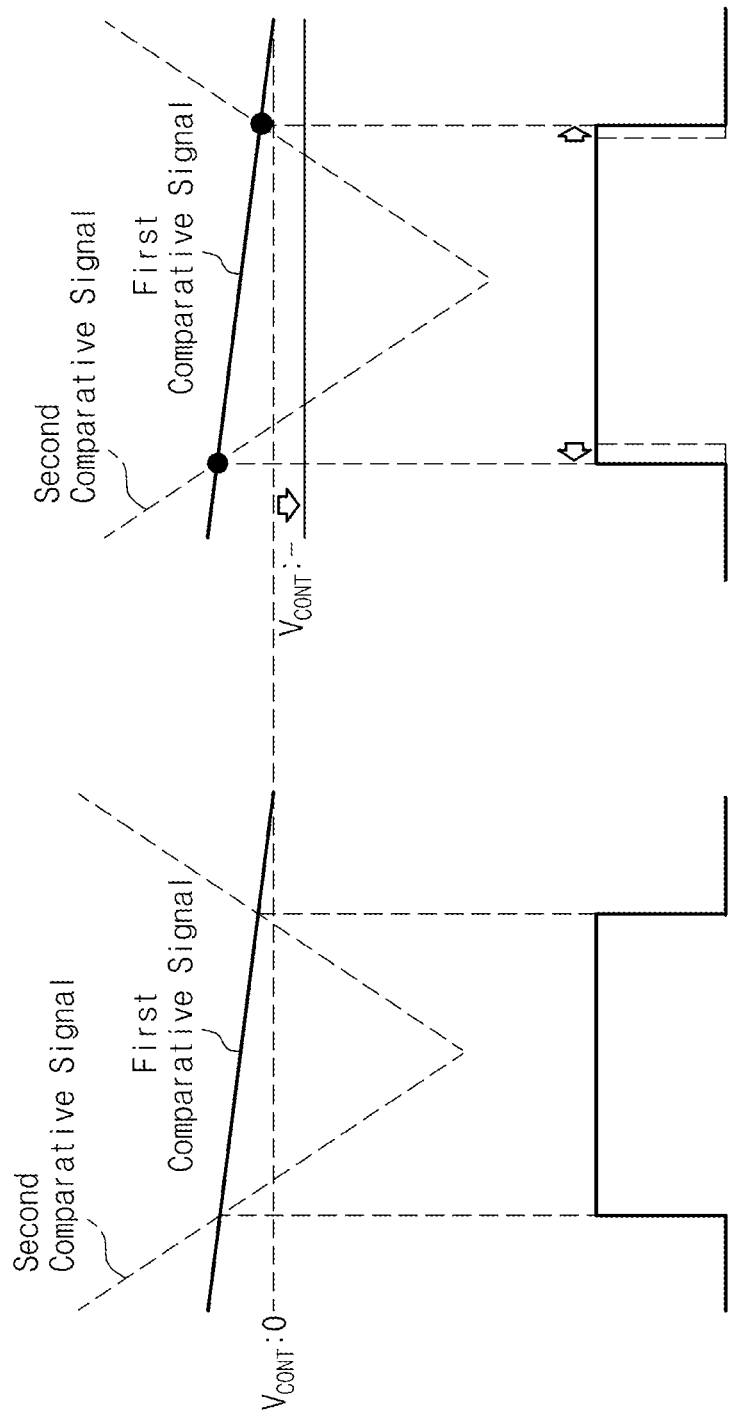

FIGS. 13 and 14 are conceptual diagrams for describing an operation that the comparator generates a PWM pulse in the PWM generating portion illustrated in FIG. 12. The comparator outputs a high only when the first comparative signal is higher than the second comparative signal and otherwise, outputs a low.

In FIG. 13, if the current control signal Vcont has a positive value, a center line of the second comparative signal rises and a section in which a high is output relatively shortens. In FIG. 14, if the current control signal Vcont has a negative value, a center line of the second comparative signal falls and a section in which a high is output relatively lengthens. That is, the PWM generator 340 can control a PWM pulse width through the current control signal (Vcont).

Figure 17A:
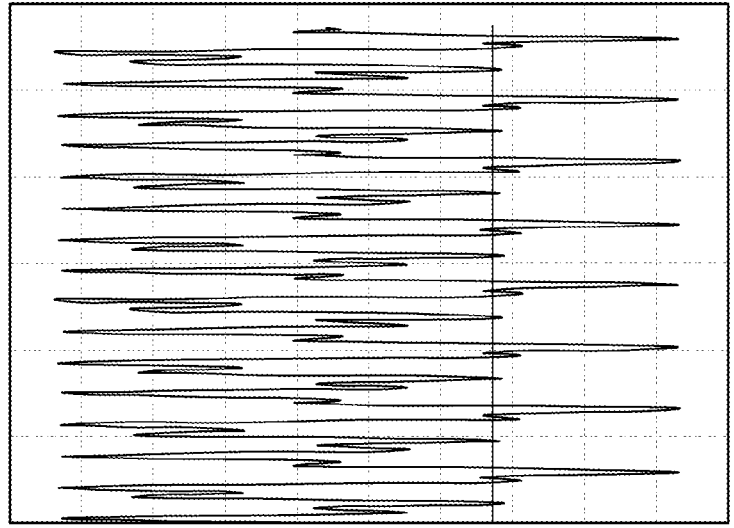
FIG. 17A and FIG. 17B represent simulation results of torque characteristic of motor control apparatus in accordance with some embodiments of the inventive concept.
Figure 17B:
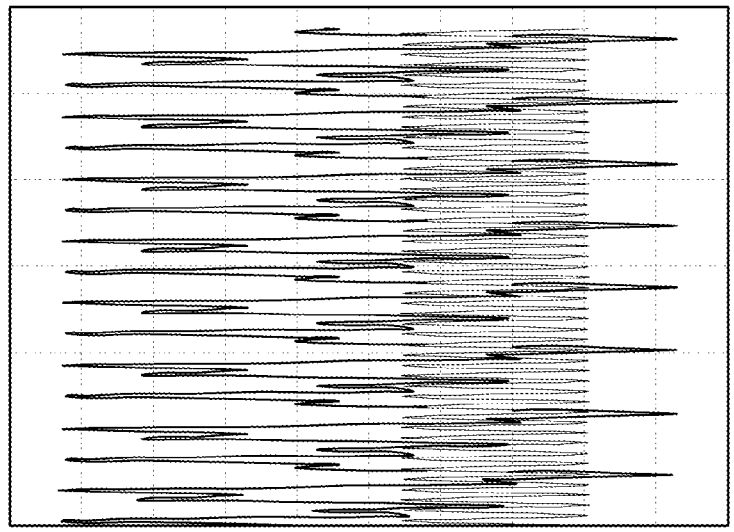

FIG. 17A and FIG. 17B is a waveform diagram showing simulation results of torque characteristic of motor control apparatus in accordance with some embodiments of the inventive concept. FIG. 17A is a torque waveform of before applying the present inventive concept to a motor. FIG. 17B is a torque waveform of after applying the present inventive concept to a motor. We can see that an effect of torque ripple reduction is great when the present inventive concept is applied to a motor.

The motor control device in accordance with some embodiments of the inventive concept reduces a torque ripple when driving a motor, it has an effect of reducing vibration and noise of the motor. Also, since a calculation of counter electromotive force is performed by an analog operation, the amount of operations of the processor performing a digital signal processing may be reduced.

2. Embodiments of Motor Control Method

Figure 15:
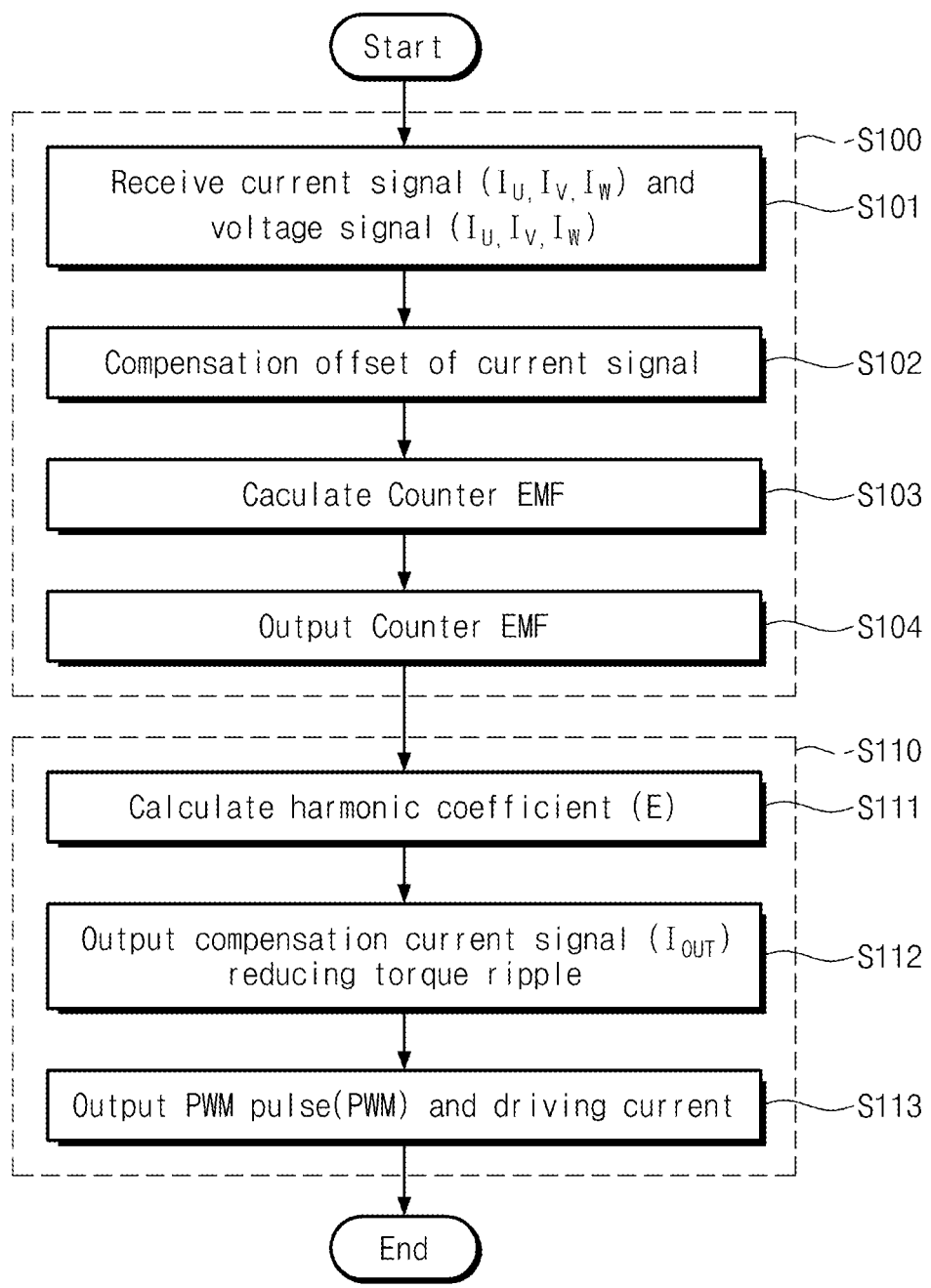
FIG. 15 is a flow chart describing a method of controlling a motor in accordance with some embodiments of the inventive concept.

FIG. 15 is a flow chart describing a method of controlling a motor in accordance with some embodiments of the inventive concept. In FIG. 15, S100 is a preprocessing step that calculates a three-phase counter electromotive force of motor using an analog operation. S110 is a postprocessing step in which a nonlinear compensation of current signal and a driving current output are performed. The S100 is performed in the preprocessing portion (200 of FIG. 1). The S110 is performed in the control portion (300 of FIG. 1).

Referring to the S100, the calculation of the three-phase counter electromotive force is performed in the order as follows. In the S101, the preprocessing portion 200 receives a three-phase current signal ($I_U$, $I_V$, $I_W$) and a three-phase voltage signal ($V_U$, $V_V$, $V_W$) provided to a motor.

In S102, the offset compensation portion (210 of FIG. 3) compensates an offset of the received three-phase current signal ($I_U$, $I_V$, $I_W$). The offset compensation is performed through two steps of offset detection and offset removal.

In S103, the counter electromotive force measuring portion (220 of FIG. 5) receives the three-phase voltage signal ($V_U$, $V_V$, $V_W$) and the three-phase current signal (hereinafter it is called a three-phase reference current signal ($I_{IN-OFF}$) of which an offset is compensated. The counter electromotive force measuring portion 220 calculates a three-phase counter electromotive force (EMF) corresponding to the received three-phase voltage signal ($V_U$, $V_V$, $V_W$) and the received three-phase reference current signal ($I_{IN-OFF}$) using an analog operation.

The sampling portion (222 of FIG. 6) outputs a differential value (hereinafter it is called a three-phase current differential signal ($\Delta I$)) of the three-phase reference current signal ($I_{IN-OFF}$) at every predetermined period with reference to the three-phase reference current signal ($I_{IN-OFF}$). Herein, the three-phase current differential signal ($\Delta I$) means a difference between a three-phase reference current signal value ($I_{IN-OFF}$ ($t_0$)) of the present period and a three-phase reference current signal value ($I_{IN-OFF}$ ($t_0$−Ts)) of the previous period (the Ts means a sampling period). A specific principle of the sampling portion 222 is described in detail in the description of the motor control device and in FIGS. 7A, 7B, 7C, 7D and 8.

The counter electromotive force operating portion (223 of FIG. 6) calculates the three-phase counter electromotive force (EMF) with reference to the three-phase reference current signal ($I_{IN-OFF}$) and the three-phase current differential signal ($\Delta I$). A calculation of the three-phase counter electromotive force (EMF) is performed by an analog operation. At this time, the analog operation is performed using the adder (223d of FIG. 6) and the subtractor (223e of FIG. 6) using an operating amplifier, and the amplifiers (223b and 223c of FIG. 6).

In S104, the preprocessing portion 200 outputs the calculated three-phase counter electromotive force (EMF).

Referring to S110, a nonlinear compensation of current signal and a driving current output are performed in the order as follows.

In S111, the three-phase counter electromotive force (EMF) received from the preprocessing portion 200 is converted into a digital signal (hereinafter, it is called a three-phase conversion signal) by the AD converter (301 of FIG. 9). The harmonic coefficient detector (320 of FIG. 9) calculates harmonic coefficients (E) of three-phase counter electromotive force with reference to the three-phase conversion signal.

In S112, the nonlinear compensation portion (330 of FIG. 11) outputs a three-phase compensation current ($I_{OUT}$) with reference to the harmonic coefficients (E) of three-phase counter electromotive force. The three-phase compensation current ($I_{OUT}$) is a current signal which is nonlinear-compensated to reduce a torque ripple. A specific method and an algorism of the nonlinear compensation performed in the nonlinear compensation portion 330 is the same with those in the motor control device.

In S113, the PWM generating portion (340 of FIG. 12) outputs a three-phase PWM pulse (PWM) with reference to a reference signal (K) and the current control signal ($V_{CONT}$) generated from the processor (310 of FIG. 12) and the three-phase compensation current ($I_{OUT}$). A width of the PWM pulse outputted by the current control signal ($V_{CONT}$) being received from the processor 310 may be controlled. The three-phase inverter (350 of FIG. 9) provides a corresponding three-phase driving current to a motor with reference to the three-phase PWM pulse (PWM).

Figure 16:
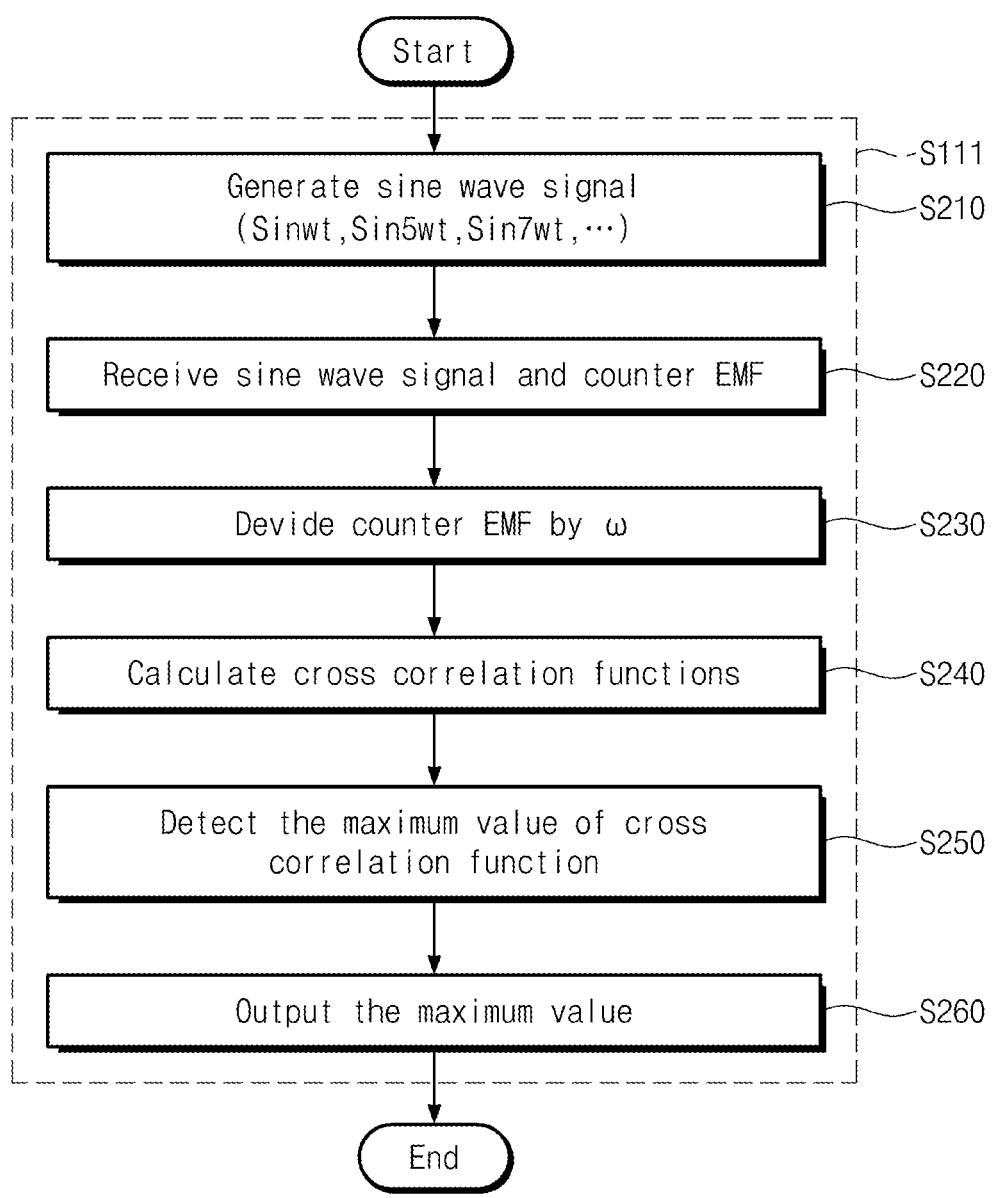
FIG. 16 is a flow chart described by subdividing S111 illustrated in FIG. 15.

FIG. 16 is a flow chart described by subdividing S111 illustrated in FIG. 15. Referring to FIG. 16, the calculation of harmonic coefficient of counter electromotive force is performed in the order as follows.

In S210, the frequency synthesizer (322 of FIG. 10) generates sine waves the amplitude of angular frequency of which is odd number times of rotation angular frequency (w). The generated sine waves may have a frequency of w, 5w, 7w, 9w, 11w or 13w.

In S220, the coefficient detector (321 of FIG. 10) receives the sine waves generated from the frequency synthesizer 322 and the three-phase counter electromotive force (EMF) calculated from the preprocessing portion (200 of FIG. 1). The counter electromotive force may be converted into a digital signal by the AD converter (301 of FIG. 9) to be received to the coefficient detector 321.

In S230, an operation of dividing the three-phase counter electromotive force (EMF) by angular frequency (w) is performed.

In S240, the coefficient detector 321 calculates cross correlation functions between the received sine waves and the three-phase counter electromotive force on which a dividing operation is performed.

In S250, the coefficient detector 321 detects the maximum value of the calculated cross correlation function.

In S260, the coefficient detector 321 outputs the detected maximum value as a three-phase counter electromotive force harmonic coefficient (E). Since a calculation of counter electromotive force is performed by an analog operation, the amount of operations of the processor performing a digital signal processing may be reduced. Also, a specific method is provided which calculates a counter electromotive force harmonic coefficient needed in the motor control device. Since a torque ripple of the motor is reduced, vibration and noise may be minimized.

According to some embodiments of the inventive concept, a torque ripple of motor may be reduced. Since a part of operation to control a motor is performed by an analog signal processing in a preprocessing portion, the amount of operations of digital processor may be reduced. A counter electromotive force harmonic coefficient of motor may be calculated. Vibration and noise of the motor may be reduced.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A motor control device comprising:
    a preprocessing portion calculating a counter electromotive force of a motor using an analog operation, a component of the counter electromotive force corresponding to a current signal of three phase current signals and a voltage signal of three phase voltage signals; and
    a control portion driving the motor with reference to the counter electromotive force,
    wherein the preprocessing portion comprises:
        an offset compensation portion receiving the current signal, compensating for an offset of the received current signal, and outputting the compensated current signal as a reference current signal; and
        a counter electromotive force measuring portion receiving the reference current signal, a reference clock signal, and the voltage signal, calculating the component of the counter electromotive force based on the received signals, and outputting a signal indicative of the calculated component of the counter electromotive force.

2. The motor control device of claim 1, wherein the offset of the received current signal is a first offset signal, and
    wherein the offset compensation portion comprises:
        an offset detecting portion receiving an input signal corresponding to the current signal, detecting a second offset of the received input signal, and outputting a signal indicative of the second offset; and
        an offset removing portion receiving the input signal and the signal indicative of the second offset compensating for the second offset of the input signal, and outputting the compensated input signal as the reference current signal.

3. The motor control device of claim 2, wherein the offset removing portion comprises a subtractor.

4. The motor control device of claim 2, wherein the offset detecting portion comprises:
    a first peak value detecting portion detecting an amplitude of a positive peak value of the input signal;
    a second peak value detecting portion detecting an amplitude of a negative peak value of the input signal; and
    a subtractor subtracting the amplitude of the negative peak value from the amplitude of the positive peak value.

5. The motor control device of claim 4, wherein each of the first peak value detecting portion and the second peak value detecting portion comprises:
    an operational amplifier including a first input terminal, a second input terminal and an output terminal, wherein the first input terminal receives the input signal;
    a diode including a cathode connected to the second input terminal and an anode connected to the output terminal; and
    a capacitor including a first terminal and a second terminal, wherein the first terminal is connected to the second input terminal and the cathode, and the second terminal is connected to a ground.

6. The motor control device of claim 1, wherein the reference current signal includes first and second reference current signals, and
    wherein the counter electromotive force measuring portion comprises:
    a sampling portion receiving the first reference current signal at a first time and the second reference current signal at a second time, a difference in time between the first and second times corresponding to a sampling period, comparing the first reference current signal with the second reference current signal, and outputting a signal indicative of a differential value between the first and second reference current signals; and
    an operating portion receiving the voltage signal, the reference current signal and the signal indicative of the differential value, calculating the component of the counter electromotive force based on the voltage signal, the reference current signal and the signal indicative of the differential value, and outputting the signal indicative of the calculated component of the counter electromotive force.

7. The motor control device of claim 6, wherein the counter electromotive force measuring portion further comprises a clock signal generating portion receiving the reference clock signal and providing a first clock signal and a second clock signal to the sampling portion.

8. The motor control device of claim 7, wherein the sampling period is determined according to a first cycle of the first clock signal and a second cycle of the second clock signal.

9. The motor control device of claim 8, wherein the first and second clock signals do not have a high value at the same time.

10. The motor control device of claim 9, wherein the sampling portion comprises:
    a first capacitor;
    a second capacitor;
    a buffer;
    a first switch operating in synchronization with the first clock signal, the first switch including one terminal that receives the reference current signal and the other terminal connected to an input terminal of the first capacitor;
    a second switch operating in synchronization with the first clock signal, the second switch including one terminal connected to an output terminal of the first capacitor and the other terminal connected to a ground;
    a third switch operating in synchronization with the first clock signal, the third switch including one terminal connected to an output terminal of the second capacitor and the other terminal connected to an input terminal of the buffer;
    a fourth switch operating in synchronization with the second clock signal, the fourth switch including one terminal that receives the reference current signal and the other terminal connected to an input terminal of the second capacitor;
    a fifth switch operating in synchronization with the second clock signal, the fifth switch including one terminal connected to an output terminal of the second capacitor and the other terminal connected to the ground; and
    a sixth switch operating in synchronization with the second clock signal, the sixth switch including one terminal connected to the output terminal of the first capacitor and the other terminal connected to the input terminal of the buffer.

11. The motor control device of claim 6, wherein the operating portion comprises;
a first inverting amplifier inverting and amplifying the signal indicative of the differential value and providing the inverted and amplified signal as a first inverting output;
a second inverting amplifier inverting and amplifying the reference current signal and providing the inverted and amplified reference current signal as a second inverting output;
an adder adding the first inverting output and the second inverting output and calculating a sum of the first and second inverting outputs; and
a subtractor subtracting the calculated sum of the adder from a value indicated by the voltage signal.

12. The motor control device of claim 11, wherein a first gain of the first inverting amplifier and a second gain of the second inverting amplifier vary with resistance values of corresponding variable resistors.

13. The motor control device of claim 12, wherein the first gain has a value obtained by dividing a value of an inductor component of the motor by the sampling period, and
wherein the second gain has a value of a phase resistance of the motor.

14. A method of controlling a motor, the method comprising:
receiving a current signal of three phase current signals, compensating for an offset of the received current signal, and outputting the compensated current signal as a reference current signal;
receiving the reference current signal, a reference clock signal, and a voltage signal of three phase voltage signals, calculating a component of a counter electromotive force based on the received signals, and outputting a signal indicative of the calculated component of the counter electromotive force;
receiving sine wave signals having angular frequencies that are odd number times of an angular frequency of the motor, and receiving the signal indicative of the component of the counter electromotive force;
dividing the component of the counter electromotive force by the angular frequency of the motor;
obtaining cross correlation functions between the received sine wave signals and the divided component of the counter electromotive force; and
obtaining maximum values of the cross correlation functions and providing the maximum values as harmonic coefficients of the component of the counter electromotive force.

15. The method of claim 14, wherein the angular frequencies of the sine wave signals include first, fifth, seventh, eleventh and thirteenth harmonics of the component of the counter electromotive force.

16. The method of claim 15, further comprising:
providing a three-phase compensation current with reference to the harmonic coefficients of the component of the counter electromotive force to reduce a torque ripple; and
determining a duty cycle of a pulse width modulation (PWM) inverter according to the three-phase compensation current and an external control signal.

17. The method of claim 16, wherein determining the duty cycle of the PWM inverter comprises comparing a triangular wave and a sine wave, wherein a reference point of the triangular wave is changed depending on a three-phase current offset of the motor or the external control signal.

18. The motor control device of claim 1, wherein the component of the counter electromotive force is calculated using the following equation:

$$EMF_i = V_i - R \times I_i - L\frac{dI_i}{dt},$$

wherein $EMF_i$ is an $i^{th}$ component of the counter electromotive force, $V_i$ is a level of the voltage signal, R is a value of a phase resistance of the motor, $I_i$ is the current signal, L is a value of a phase self-inductance of the motor, and t is a time.

19. A motor control device comprising:
a preprocessing portion calculating a counter electromotive force of a motor using an analog operation, a component of the counter electromotive force corresponding to a current signal of three phase current signals and a voltage signal of three phase voltage signals; and
a control portion driving the motor with reference to the counter electromotive force,
wherein the preprocessing portion comprises:
an offset compensation portion receiving the current signal, compensating for an offset of the received current signal, and outputting the compensated current signal as a reference current signal; and
a counter electromotive force measuring portion receiving the reference current signal, a reference clock signal, and the voltage signal, calculating the component of the counter electromotive force based on the received signals, and outputting a signal indicative of the calculated component of the counter electromotive force,
wherein the reference current signal includes first and second reference current signals, and
wherein the counter electromotive force measuring portion comprises:
a sampling portion receiving the first reference current signal at a first time and the second reference current signal at a second time, a difference in time between the first and second times corresponding to a sampling period, comparing the first reference current signal with the second reference current signal, and outputting a signal indicative of a differential value between the first and second reference current signals; and
an operating portion receiving the voltage signal, the reference current signal and the signal indicative of the differential value, calculating the component of the counter electromotive force based on the voltage signal, the reference current signal and the signal indicative of the differential value, and outputting the signal indicative of the calculated component of the counter electromotive force.

* * * * *